(12) United States Patent
Tanaka

(10) Patent No.: US 10,133,246 B2
(45) Date of Patent: Nov. 20, 2018

(54) POSITION CONTROL DEVICE AND POSITION CONTROL METHOD, OPTICAL DEVICE, AND IMAGE PICKUP APPARATUS

(71) Applicant: CANON KABUSHIKI KAISHA, Tokyo (JP)

(72) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 14/845,252

(22) Filed: Sep. 3, 2015

(65) Prior Publication Data

US 2016/0080658 A1 Mar. 17, 2016

(30) Foreign Application Priority Data

Sep. 12, 2014 (JP) ................................. 2014-186020
Aug. 27, 2015 (JP) ................................. 2015-167573

(51) Int. Cl.
*G05B 13/04* (2006.01)
*H04N 5/232* (2006.01)
*G02B 7/10* (2006.01)

(52) U.S. Cl.
CPC ............. *G05B 13/04* (2013.01); *G02B 7/102* (2013.01); *H04N 5/2328* (2013.01); *G05B 2219/41437* (2013.01); *G05B 2219/42065* (2013.01)

(58) Field of Classification Search
CPC ........... G05B 2219/41199; G05B 2219/41337; G05B 2219/41425–2219/41453; G02B 7/102; G02B 27/646; H04N 5/2328–5/23287; G03B 2205/0007–2205/0038
See application file for complete search history.

(56) References Cited

U.S. PATENT DOCUMENTS

| | | | |
|---|---|---|---|
| 5,191,272 A | 3/1993 | Torii et al. | |
| 6,087,878 A | 7/2000 | Suzuki et al. | |
| 6,154,424 A * | 11/2000 | Kao | G11B 7/08517 369/44.28 |
| 7,750,592 B2 | 7/2010 | Eguchi | |

(Continued)

FOREIGN PATENT DOCUMENTS

| | | |
|---|---|---|
| JP | 3-289385 A | 12/1991 |
| JP | 4673326 B | 4/2011 |

*Primary Examiner* — Dennis Hogue
(74) *Attorney, Agent, or Firm* — Fitzpatrick, Cella, Harper & Scinto

(57) ABSTRACT

A position control device includes a position detector that detects a position of an object to be controlled; a target generator that outputs a target velocity and a target position of the object to be controlled; a first calculator that calculates a control amount for causing the object to be controlled to track the target position; a second calculator that calculates a control amount for controlling the velocity of the object to be controlled, to be at the target velocity; a control signal output unit that outputs a control signal according to a total control amount obtained by the first and the second calculators; and a storage unit that stores an attitudinal change correction amount. The second calculator acquires the attitudinal change correction amount stored in the storage unit, adds the attitudinal change correction amount to the control amount to correct the control amount, and outputs the corrected control amount.

16 Claims, 23 Drawing Sheets

(56) References Cited

U.S. PATENT DOCUMENTS

| | | | |
|---|---|---|---|
| 2004/0136704 A1* | 7/2004 | Usui | G03B 5/00 |
| | | | 396/55 |
| 2007/0091094 A1* | 4/2007 | Hong | G05B 19/41 |
| | | | 345/474 |
| 2010/0152868 A1* | 6/2010 | Chen | G05B 11/42 |
| | | | 700/42 |
| 2010/0185304 A1* | 7/2010 | El-Rifai | G05B 11/42 |
| | | | 700/45 |
| 2010/0237819 A1* | 9/2010 | Binnard | G03F 7/70725 |
| | | | 318/632 |
| 2011/0158618 A1* | 6/2011 | Ibi | G02B 7/102 |
| | | | 396/55 |

* cited by examiner

FIG. 10

| | (A) Time or period | (B) Attitude | (C) Moving direction | (D) PID control amount | (E) FF control amount | (F) Attitudinal change correction amount | (G) Attitudinal-change -corrected FF control amount | (H) Total control amount |
|---|---|---|---|---|---|---|---|---|
| (1) | T0 → T1 | Horizontal | Stopped | 0 | 0 | 0 | 0 | 0 |
| (2) | T1 | Horizontal | Moving leftward | 0 | 15 | 0 | 15 | 15 |
| (3) | T1 → T2 | Horizontal | Moving leftward at constant velocity | 10 | 0 | 0 | 0 | 10 |
| (4) | T2 → T3 | Horizontal | Stopped | 0 | 0 | 0 | 0 | 0 |
| (5) | T3 | Horizontal | moving rightward | 0 | -15 | 0 | -15 | -15 |
| (6) | T3 → T4 | Horizontal | Moving rightward at constant velocity | -10 | 0 | 0 | 0 | -10 |
| (7) | T4 → T5 | Horizontal | Stopped | 0 | 0 | 0 | 0 | 0 |
| (8) | T6 → T7 | Tilt 1 | Stopped | -10 | 0 | -10 | 0 | -10 |
| (9) | T7 | Tilt 1 | Moving leftward | -10 | 15 | -10 | 5 | -5 |
| (10) | T7 → T8 | Tilt 1 | Moving leftward at constant velocity | 0 | 0 | -10 | 0 | 0 |
| (11) | T8 → T9 | Tilt 1 | Stopped | -10 | 0 | -10 | 0 | -10 |
| (12) | T9 | Tilt 1 | Moving rightward | -10 | -30 | -10 | -40 | -50 |
| (13) | T9 → T10 | Tilt 1 | Moving rightward at constant velocity | -30 | 0 | -10 | 0 | -30 |
| (14) | T11 | Tilt 1 | Stopped | -10 | 0 | -10 | 0 | -10 |
| (15) | T12 | Tilt 2 | Moving leftward | 5 | 15 | 5 | 20 | 25 |
| (16) | T12 → T13 | Tilt 2 | Moving leftward at constant velocity | 15 | 0 | 5 | 0 | 15 |
| (17) | T13 → T14 | Tilt 2 | Stopped | 5 | 0 | 5 | 0 | 5 |
| (18) | T14 | Tilt 2 | Moving rightward | 5 | -15 | 5 | -10 | -5 |
| (19) | T14 → T15 | Tilt 2 | Moving rightward at constant velocity | -5 | 0 | 5 | 0 | -5 |
| (20) | T15 → T16 | Tilt 2 | Stopped | 5 | 0 | 5 | 0 | 5 |

FIG. 15

| | (A) Time or period | (B) Attitude | (C) Moving direction | (D) PID control amount | (E) FF control amount | (F) Attitudinal change correction amount | (G) Attitudinal-change-corrected FF control amount | (I) Previous total control amount | (J) Disturbance estimation control amount = (I) − (F) | (K) Disturbance canceling control amount | (L) Present total control amount = (D)+(G)+(K) |
|---|---|---|---|---|---|---|---|---|---|---|---|
| (1) | T0 → T1 | horizontal | Stopped | 0 | 0 | 0 | 0 | | Calculation OFF | 0 | 0 |
| (2) | T1 | horizontal | Moving leftward | 0 | 15 | 0 | 15 | | Calculation OFF | 0 | 15 |
| (3) | T1 → T2 | horizontal | Moving leftward at constant velocity | 10 | 0 | 0 | 0 | 10 | 10 | 1 | 11 |
| (4) | T2 → T3 | horizontal | Stopped | 0 | 0 | 0 | 0 | | Calculation OFF | 0 | 0 |
| (5) | T3 | horizontal | Moving rightward | 0 | −15 | 0 | −15 | | Calculation OFF | 0 | −15 |
| (6) | T3 → T4 | horizontal | Moving rightward at constant velocity | −10 | 0 | 0 | 0 | −10 | −10 | −1 | −11 |
| (7) | T4 → T5 | horizontal | Stopped | 0 | 0 | 0 | 0 | | Calculation OFF | 0 | 0 |
| (8) | T6 → T7 | Tilt 1 | Stopped | −10 | 0 | −10 | 0 | | Calculation OFF | 0 | −10 |
| (9) | T7 | Tilt 1 | Moving leftward | −10 | 15 | −10 | 5 | | Calculation OFF | 0 | −5 |
| (10) | T7 → T8 | Tilt 1 | Moving leftward at constant velocity | 0 | 0 | −10 | 0 | 0 | 10 | 1 | 1 |
| (11) | T8 → T9 | Tilt 1 | Stopped | −10 | 0 | −10 | 0 | | Calculation OFF | 0 | −10 |
| (12) | T9 | Tilt 1 | Moving rightward | −10 | −30 | −10 | −40 | | Calculation OFF | 0 | −50 |
| (13) | T9 → T10 | Tilt 1 | Moving rightward at constant velocity | −30 | 0 | −10 | 0 | −30 | −20 | −1 | −31 |
| (14) | T11 | Tilt 1 | Stopped | −10 | 0 | −10 | 0 | | Calculation OFF | 0 | −10 |
| (15) | T12 | Tilt 2 | Moving leftward | 5 | 15 | 5 | 20 | | Calculation OFF | 0 | 25 |
| (16) | T12 → T13 | Tilt 2 | Moving leftward at constant velocity | 15 | 0 | 5 | 0 | 15 | 10 | 1 | 16 |
| (17) | T13 → T14 | Tilt 2 | Stopped | 5 | 0 | 5 | 0 | | Calculation OFF | 0 | 5 |
| (18) | T14 | Tilt 2 | Moving rightward | 5 | −15 | 5 | −10 | | Calculation OFF | 0 | −5 |
| (19) | T14 → T15 | Tilt 2 | Moving rightward at constant velocity | −5 | 0 | 5 | 0 | −5 | −10 | −1 | −6 |
| (20) | T15 → T16 | Tilt 2 | Stopped | 5 | 0 | 5 | 0 | | Calculation OFF | 0 | 5 |

POSITION CONTROL DEVICE AND POSITION CONTROL METHOD, OPTICAL DEVICE, AND IMAGE PICKUP APPARATUS

BACKGROUND OF THE INVENTION

Field of the Invention

The present invention relates to a device and method for controlling the position of an object to be controlled according to feedback control and feedforward control, and an optical device and an image pickup apparatus using the same.

Description of the Related Art

A servo control system that performs feedback control based on detection information of an absolute position of a object to be controlled and performs feedforward control according to a target value of the object to be controlled is known. Japanese Patent Laid-Open No. H03-289385 discloses a servo control system capable of calculating a feedback gain from a feedforward gain and automatically adjusting the feedback gain. Moreover, Japanese Patent No. 4673326 discloses a position control device that performs adaptive identification to correct the parameters of feedback control and feedforward control.

In Japanese Patent Laid-Open No. H03-289385, it is assumed that a controller is installed in a fixed coordinate system. When an installed attitude of the entire apparatus changes, the controller calculates a feedforward output based on a change in a target value. However, force that balances against the force associated with the attitudinal change causes a loss or surplus of force. Thus, an intended accelerating force is not generated, and depending on the amount of an attitudinal change, the velocity may change when a driving direction changes.

In Japanese Patent No. 4673326, it is assumed that the control device is installed in a fixed coordinate system. When an attitude in which the entire apparatus is installed changes, adaptive identification is performed based on a driving command applied to a driving unit. However, a driving command component for resisting an attitudinal change becomes a bias component. Thus, an identification error may occur depending on the amount of an attitudinal change when the apparatus is in an attitude other than a horizontal attitude.

SUMMARY OF THE INVENTION

The present invention provides a position control device and method capable of suppressing the possibility of a velocity difference occurring due to a difference in a driving direction even when an attitude of a object to be controlled changes. The present invention also provides an adaptive identifier capable of reducing an identification error of adaptive identification even when an attitude of an object to be controlled changes.

According to a first aspect of the present invention, a position control device is provided that includes a position detector that detects a position of an object to be controlled; a target generator that outputs a target velocity and a target position of the object to be controlled; a first calculator that calculates a control amount for causing the object to be controlled to track the target position; a second calculator that calculates a control amount for controlling the velocity of the object to be controlled, to be at the target velocity; a control signal output unit that outputs a control signal to the object to be controlled according to a total control amount obtained by adding the control amount calculated by the first calculator and the control amount calculated by the second calculator; and a storage unit that stores an attitudinal change correction amount which is a control amount that resists an attitudinal change of the object to be controlled during position control of controlling the object to be controlled to be at a fixed position, wherein the second calculator acquires the attitudinal change correction amount stored in the storage unit, adds the attitudinal change correction amount to the control amount to correct the control amount, and outputs the corrected control amount when the object to be controlled is being controlled to be at the target velocity.

According to a second aspect of the present invention, a position control device is provided that includes a first calculator that calculates a control amount for causing a object to be controlled to track a target position according to a position of the object to be controlled detected by a position detector; an adaptive identification unit that adaptively identifies a parameter of an identification model based on an input for identification, a response of the identification model to the input, and a response of an object to be identified so that the response to the identification model matches the response of the object to be identified; and a storage unit that stores an attitudinal change correction amount which is a control amount for maintaining a stopped state of the object to be controlled when the object to be controlled is in the stopped state, wherein the input for identification of the adaptive identification unit is a control amount corresponding to a control amount obtained by calculating the attitudinal change correction amount stored in the storage unit from the control amount calculated by the first calculator, and the response of the object to be identified is a moving amount of the object to be controlled.

According to a third aspect of the present invention, a position control device is provided that includes a first calculator that calculates a control amount for causing a object to be controlled to track a target position according to a position of the object to be controlled detected by a position detector; a second calculator that calculates a control amount for controlling a velocity of the object to be controlled to be a target velocity; an adaptive identification unit that adaptively identifies a parameter of an identification model based on an input for identification, a response of the identification model to the input, and a response of an object to be identified so that the response of the identification model matches the response of the object to be identified; and a storage unit that stores an attitudinal change correction amount which is a control amount for maintaining a stopped state of the object to be controlled when the object to be controlled is in the stopped state, wherein the input for identification of the adaptive identification unit is a control amount corresponding to a control amount obtained by calculating the attitudinal change correction amount stored in the storage unit from a control amount obtained by adding the control amount calculated by the first calculator and the control amount calculated by the second calculator, and the response of the object to be identified is a moving amount of the object to be controlled.

According to the present invention, it is possible to suppress the possibility of a velocity difference occurring due to a difference in a driving direction even when an attitude of an object to be controlled changes. Moreover, it is possible to reduce the possibility of an identification error occurring even when an attitude of an object to be controlled changes.

Further features of the present invention will become apparent from the following description of exemplary embodiments (with reference to the attached drawings).

BRIEF DESCRIPTION OF THE DRAWINGS

FIG. 10 is a diagram illustrating examples of numerical changes in the first embodiment.

FIG. 15 is a diagram illustrating examples of numerical changes in the second embodiment.

DESCRIPTION OF THE EMBODIMENTS

Hereinafter, embodiments of the present invention will be described with reference to the drawings. The present invention can be applied in controlling the driving of optical members of an image pickup apparatus such as a digital signal-lens reflex camera, a digital compact camera, a digital video camera, a surveillance camera, a Web camera, or a cellular phone, for example. Moreover, the present invention can be applied to an optical device such as a replacement lens for the digital single-lens reflex camera. Thus, the optical device and the image pickup apparatus also form an aspect of the present invention. In the embodiments, a voice coil linear motor will be described as an example of an actuator which does not exert holding force when thrust is not generated.

First Embodiment

In a first embodiment of the present invention, the output of a feedback compensator when the target velocity is 0 and the position is being controlled to be at a fixed position is stored as an attitudinal change correction amount. In feedforward control for causing a object to be controlled to track a target velocity when the target velocity changes, a feedforward output is corrected based on the attitudinal change correction amount.

Figure 1:
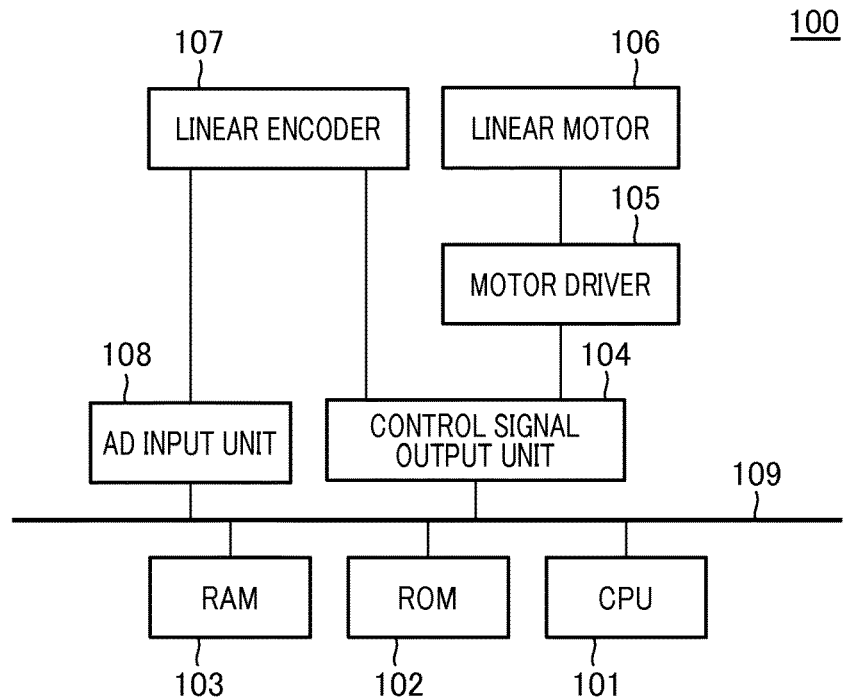
FIG. 1 is a block diagram of a position control device according to an embodiment of the present invention.

FIG. 1 illustrates a configuration example of a position control device 100, which is common to the embodiments of the present invention. A central processing unit (CPU) 101, a read only memory (ROM) 102, a random access memory (RAM) 103, a control signal output unit 104, and an AD input unit 108 are connected to an internal bus 109. The respective units can transmit and receive data to and from each other via the internal bus 109. The ROM 102 is a ROM that stores various programs and the like for allowing the CPU 101 to operate. The CPU 101 which serves as a control unit and a measuring unit controls the respective units of the position control device 100 according to a program stored in the ROM 102 using the RAM 103 as a work memory, for example.

The control signal output unit 104 outputs a control signal issued from the CPU 101 to the motor driver 105 to cause the motor driver 105 to drive a linear motor 106. Moreover, the control signal output unit 104 outputs the control signal issued from the CPU 101 to a linear encoder 107 to cause the linear encoder 107 to output incremental signals of different phases. The linear motor 106 moves a object to be controlled (not illustrated) such as a lens. The linear encoder 107 for detecting positions outputs an incremental signal according to a movement of the object to be controlled. The AD input unit 108 converts the analog incremental signal output by the linear encoder 107 to a digital signal and outputs the analog-to-digital (AD)-converted signal to the CPU 101. The CPU 101 calculates a present position from the incremental signal converted by the AD input unit 108 by an incremental position encoding process (hereinafter referred to as a first encoding process) and an absolute position encoding process (hereinafter referred to as a second encoding process).

Figure 2A:
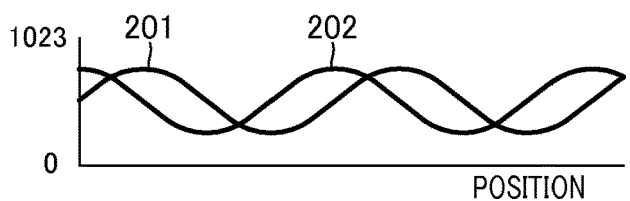
FIGS. 2A to 2C are conceptual diagrams of the processing of an incremental signal.
Figure 2B:
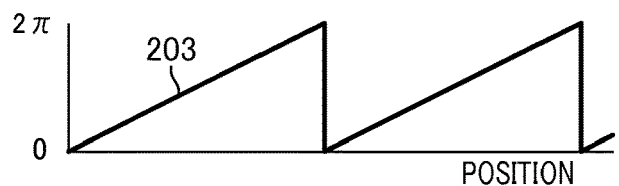
Figure 2C:
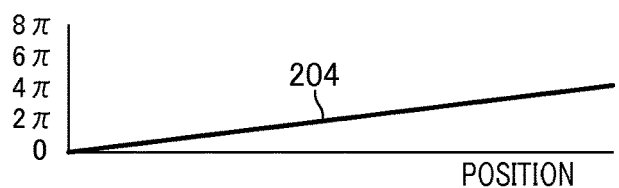
Figure 3:
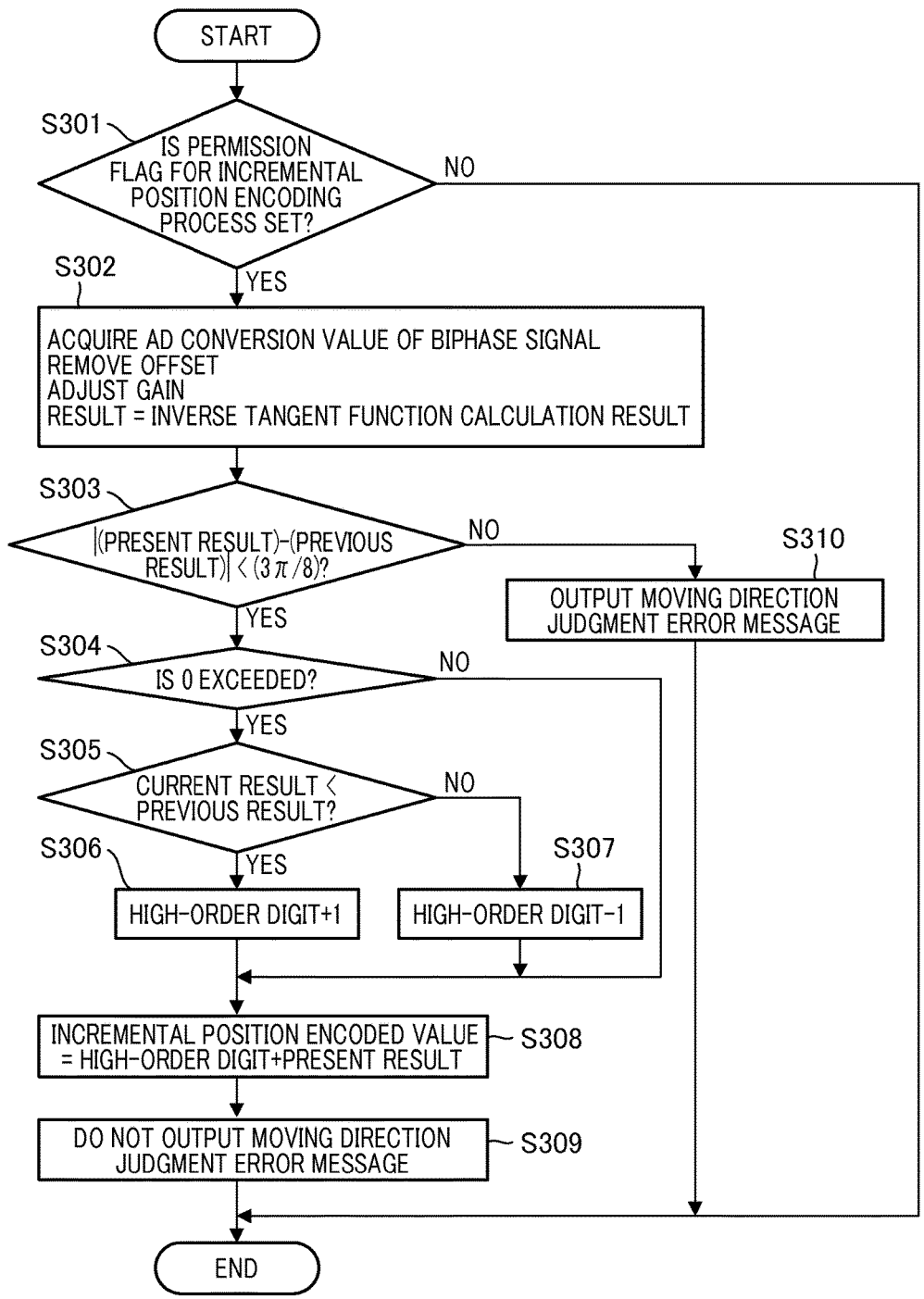
FIG. 3 is a flowchart illustrating an incremental position encoding process.

The first encoding process will be described with reference to FIGS. 2A to 2C and FIG. 3. FIGS. 2A to 2C are conceptual diagrams illustrating the processing of the incremental signal. FIG. 3 is a flowchart illustrating the first encoding process executed by the CPU 101.

FIG. 2A illustrates a waveform example of the incremental signal. The vertical axis represents a 10-bit AD conversion value and the horizontal axis represents a position. A sine wave 201 and a cosine wave 202 are output according to a movement of the object to be controlled. FIG. 2B illustrates the inverse functions (inverse tangent functions) of the tangent functions of the sine wave 201 and the cosine wave 202. The vertical axis represents an angle in radians and the horizontal axis represents a position. An inverse tangent function value 203 is calculated by being normalized to the range of 0 to $2\pi$. FIG. 2C illustrates an incremental position encoded value. The vertical axis represents an incremental position encoded value 204 that increases monotonically and the horizontal axis represents a position.

When the inverse tangent function value 203 exceeds zero, a high-order digit in the most significant bit (MSB) corresponding to $2\pi$ increases or decreases. For example, when the inverse tangent function value 203 increases from zero, decreases to zero again, and increases further, $2\pi$ is added to the incremental position encoded value 204. On the other hand, when the inverse tangent function value 203 decreases to zero, $2\pi$ is subtracted from the incremental position encoded value 204.

The first encoding process will be described with reference to FIG. 3. In S301, the CPU 101 determines whether or not a permission flag for the first encoding process is set. When the permission flag is not set, the process ends. When the permission flag is set, the process proceeds to S302. In S302, the CPU 101 acquires an AD conversion value of a biphase signal and performs an offset removing operation and a gain adjustment operation. The biphase signal is a pair of signals having different phases like the sine wave 201 and the cosine wave 202 of FIG. 2A. The CPU 101 stores the data of a calculation result (the inverse tangent function value 203) of the inverse tangent function illustrated in FIG. 2B in the RAM 103.

In S303, the CPU 101 compares an absolute value of the difference between a previous inverse tangent function calculation result and a present inverse tangent function calculation result with $3\pi/8$. That is, it is determined whether or not the absolute value of the difference is smaller than $3\pi/8$. When the absolute value of the difference is smaller than $3\pi/8$, the process proceeds to S304. When the absolute value of the difference is not smaller than $3\pi/8$, the process proceeds to S310. In S304, the CPU 101 determines whether or not the position of the object to be controlled moved according to the previous inverse tangent function calculation result and the present inverse tangent function calculation result exceeds zero. When the position exceeds zero, the process proceeds to S305. When the position does not exceed zero, the process proceeds to S308. In S305, the CPU 101 determines whether or not the present inverse tangent function calculation result is smaller than the previous inverse tangent function calculation result. When the present inverse tangent function calculation result is smaller than the previous inverse tangent function calculation result, the process proceeds to S306. When the present inverse tangent function calculation result is equal to or larger than the previous inverse tangent function calculation result, the process proceeds to S307. In S306, the CPU 101 adds "1" to the high-order digit which is the digit unit place of $2\pi$. The high-order digit is a digit in which the incremental position encoded value is $2\pi$ or more. On the other hand, in S307, the CPU 101 subtracts "1" from the high-order digit.

After S306 or S307 is performed, the process proceeds to S308 and the CPU 101 adds the high-order digit which is the digit unit place of $2\pi$ and the present inverse tangent function calculation result. In this way, the incremental position encoded value 204 of FIG. 2C is updated and the process proceeds to S309. In S309, the CPU 101 ends the process without outputting an error message associated with a moving direction judgment. When the process proceeds from S303 to S310, the CPU 101 ends the process by outputting an error message associated with a moving direction judgment. This is because the absolute value of the difference between the present and previous inverse tangent function calculation results is equal to or larger than $3\pi/8$ and it is difficult to judge whether the absolute value of the difference has become equal to or larger than $3\pi/8$ due to an increase or a decrease in the moving direction of the object to be controlled.

Since the encoded value is generated from the incremental signal in this manner, the incremental signal can be used for controlling positions.

Next, the second encoding process will be described with reference to FIGS. 4A to 4F and FIG. 5. FIGS. 4A to 4F are conceptual diagrams of examples of three incremental signals having different pitches and combined signals thereof. In FIGS. 4A to 4F, the vertical axis represents an angle in radians and the horizontal axis represents a position. An inverse tangent function value illustrated on the vertical axis is calculated by being normalized to the range of 0 and $2\pi$ as an inverse tangent function according to a movement of a object to be controlled. FIG. 5 is a flowchart illustrating the second encoding process of the CPU 101.

Figure 4:
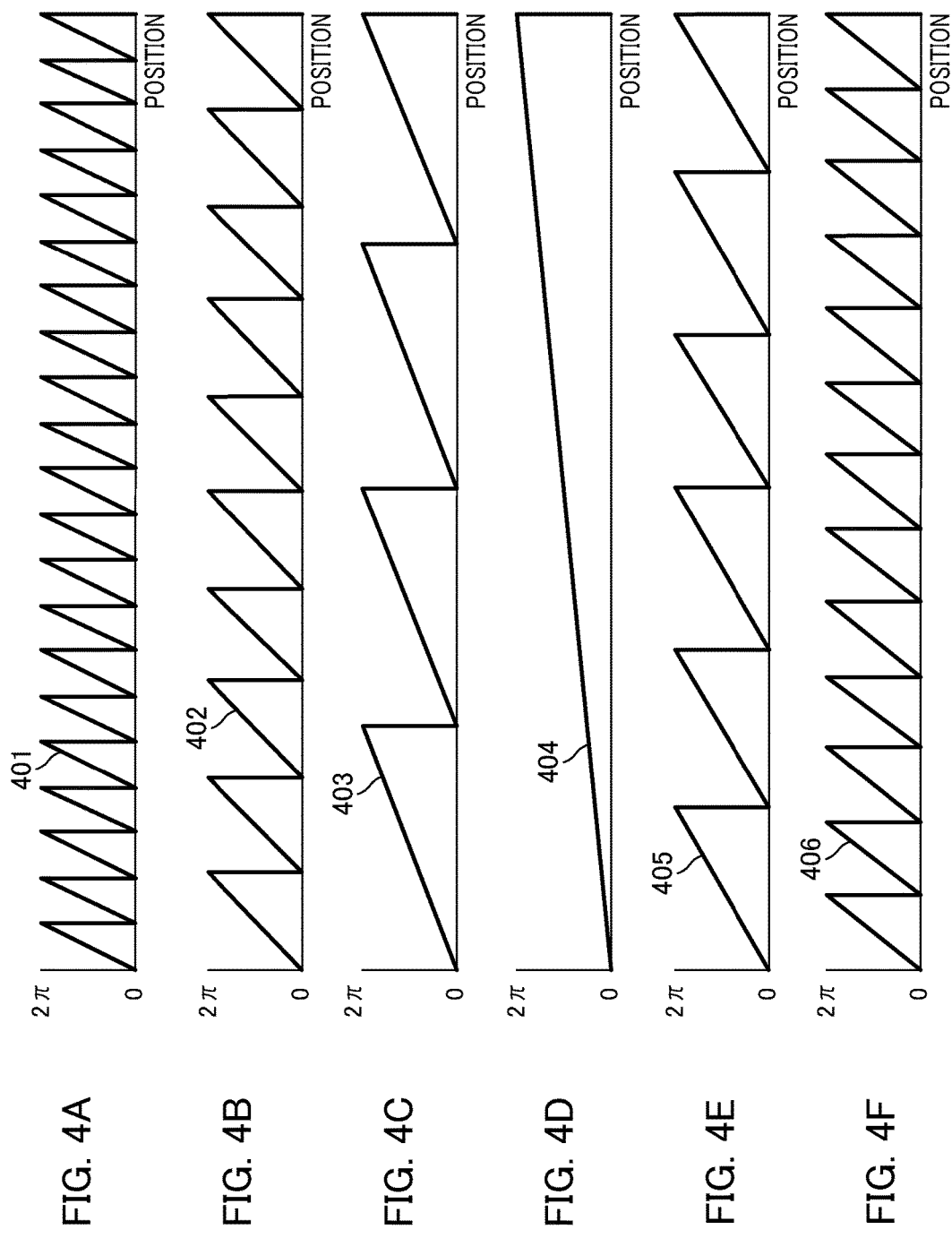
FIGS. 4A to 4F are conceptual diagrams of an incremental signal and a combined signal.
Figure 5:
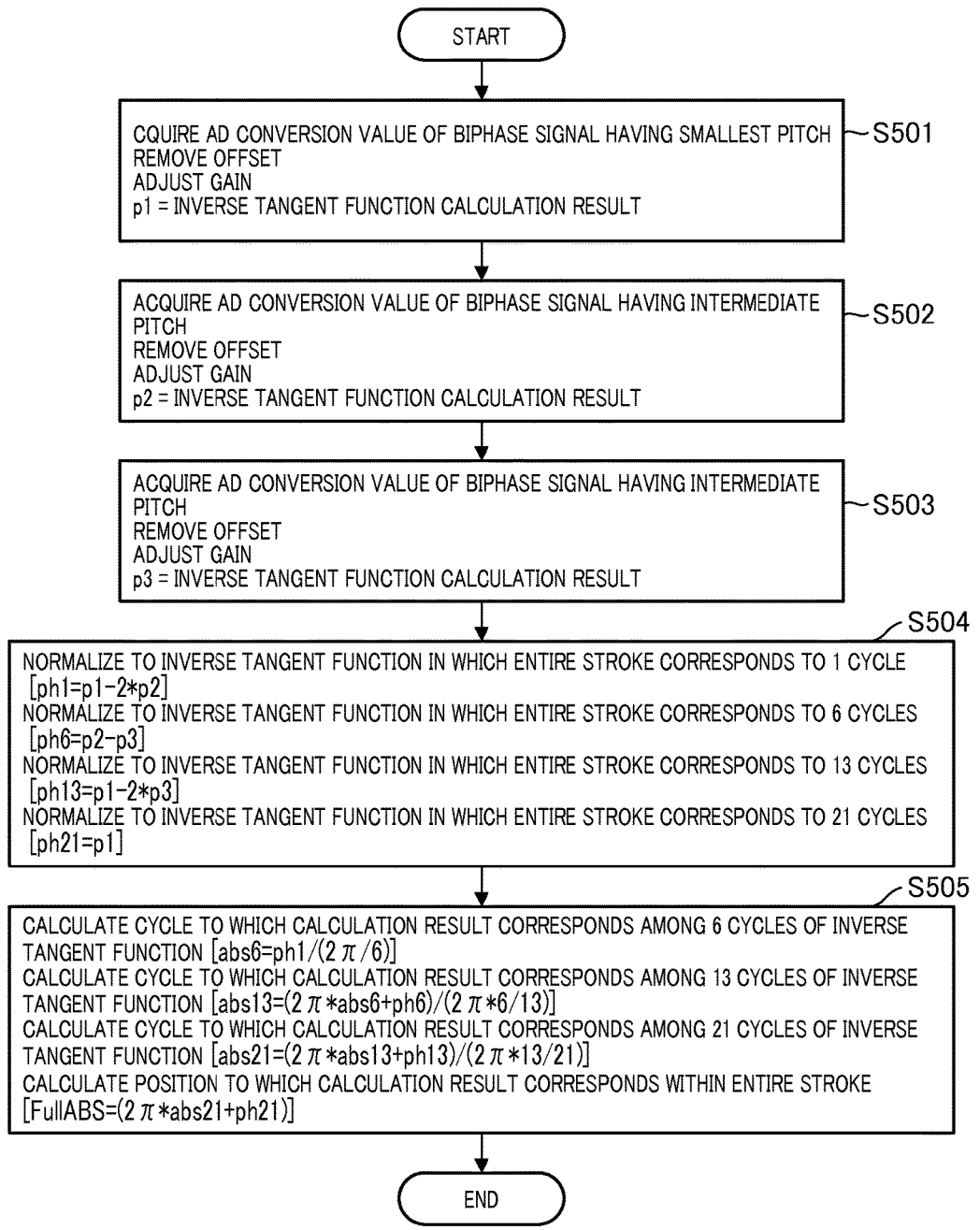
FIG. 5 is a flowchart illustrating an absolute position encoding process.

FIG. 4A illustrates an inverse tangent function calculation result 401 having the smallest pitch, in which 21 cycles appear in the entire stroke. FIG. 4B illustrates an inverse tangent function calculation result 402 having an intermediate pitch, in which 10 cycles appear in the entire stroke. FIG. 4C illustrates an inverse tangent function calculation result 403 having the largest pitch, in which four cycles appear in the entire stroke. FIGS. 4D to 4F will be described later.

In S501 of FIG. 5, the CPU 101 acquires an AD conversion value of a biphase signal having the smallest pitch stored in the RAM 103 and performs an offset removing operation and a gain adjustment operation. Moreover, the CPU 101 stores the inverse tangent function calculation result 401 of FIG. 4A in the RAM 103 as "p1." Subsequently, in S502, the CPU 101 acquires an AD conversion value of a biphase signal having the intermediate pitch stored in the RAM 103 and performs an offset removing operation and a gain adjustment operation. The CPU 101 stores the inverse tangent function calculation result 402 of FIG. 4B in the RAM 103 as "p2." Subsequently, in S503, the CPU 101 acquires an AD conversion value of a biphase signal having the largest pitch stored in the RAM 103 and performs an offset removing operation and a gain adjustment operation. The CPU 101 stores the inverse tangent function calculation result 403 of FIG. 4C in the RAM 103 as "p3" and proceeds to S504.

In S504, the CPU 101 performs a process of normalizing the inverse tangent function calculation result to an inverse tangent function in which the entire stroke corresponds to N cycles (N is an integer variable) using the following equations. The process will be described in detail for the cases N=1, 6, 13, and 21.

[Formula. 1]

$$ph1 = p1 - 2*p2 \qquad \text{Equation (1):}$$

$$ph6 = p2 - p3 \qquad \text{Equation (2):}$$

$$ph13 = p1 - 2*p3 \qquad \text{Equation (3)}$$

The equations (1), (2), and (3) are used for N=1, N=6, and N=13, respectively.

Figure 21:
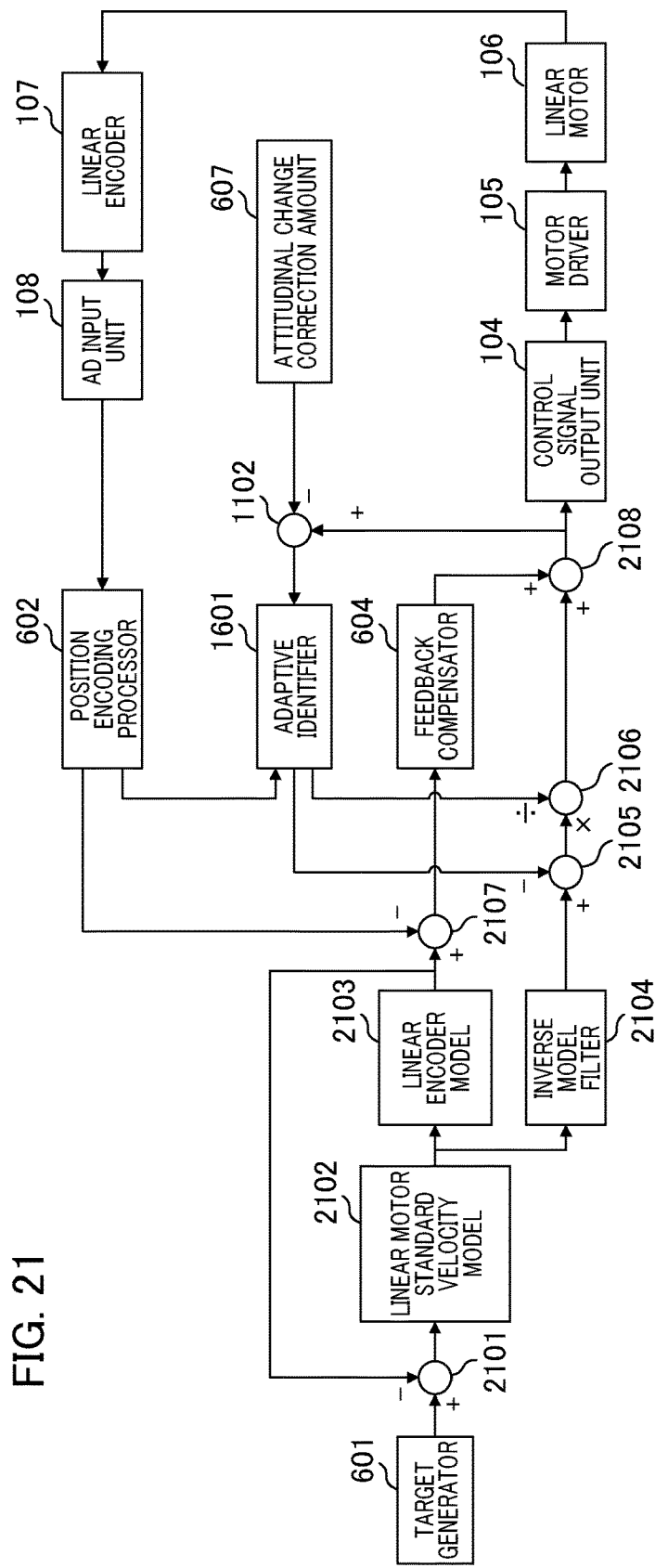
FIG. 21 is a block diagram according to a fourth embodiment of the present invention.

For N=1, the CPU 101 calculates ph1 according to Equation (1) using the data of p1 and p2 stored in the RAM 103 and stores the data of the calculation result in the RAM 103. The calculation result 404 illustrated in FIG. 4D illustrates ph1 calculated by being normalized to the range of 0 to $2\pi$ as the result of Equation (1) according to a movement of the object to be controlled, in which one cycle appears in the entire stroke. For N=6, the CPU 101 calculates ph6 according to Equation (2) using the data of p2 and p3 stored in the RAM 103 and stores the data of the calculation result in the RAM 103. The calculation result 405 illustrated in FIG. 4E illustrates ph6 calculated by being normalized to the range of 0 to 2π as the result of Equation (2) according to a movement of the object to be controlled, in which six cycles appear in the entire stroke. For N=13, the CPU 101 calculates ph13 according to Equation (3) using the data of p1 and p3 stored in the RAM 103 and stores the data of the calculation result in the RAM 103. The calculation result 406 illustrated in FIG. 4F illustrates ph13 calculated by being normalized to the range of 0 to 2π as the result of Equation (3) according to a movement of the object to be controlled, in which 13 cycles appears in the entire stroke. For N=21, the CPU 101 stores the data of p1 stored in the RAM 103 in the RAM 103 in the RAM 103 as the data of ph21 (ph21=p1). As illustrated in FIG. 4A, 21 cycles appear in the entire stroke of ph21.

Subsequently, in S505, the CPU 101 calculates the cycle to which the calculation result corresponds among the N cycles using the following equations.

[Formula. 2]

$$abs6 = ph1/(2\pi/6) \quad \text{Equation (4):}$$

$$abs13 = (2\pi * abs6 + ph6)/(2\pi * 6/13) \quad \text{Equation (5):}$$

$$abs21 = (2\pi * abs13 + ph13)/(2\pi * 6/21) \quad \text{Equation (6):}$$

$$\text{FullABS} = (2\pi * abs21 + ph21) \quad \text{Equation (7):}$$

The CPU 101 calculates the cycle to which ph1 corresponds among the six cycles appearing in the entire stroke according to Equation (4) using the data of ph1 stored in the RAM 103 and stores the data of abs6 in the RAM 103. Moreover, the CPU 101 calculates the cycle to which ph6 corresponds among the 13 cycles appearing in the entire stroke according to Equation (5) using the data of abs6 and ph6 and stores the data of abs13 in the RAM 103. Further, the CPU 101 calculates the cycle to which ph13 corresponds among the 21 cycles appearing in the entire stroke according to Equation (6) using the data of abs13 and ph13 and stores the data of abs21 in the RAM 103. Further, the CPU 101 calculates the position to which ph21 corresponds within the entire stroke with the resolution of the smallest pitch according to Equation (7) using the data of abs21 and ph21 and stores the data of FullABS in the RAM 103. After that, the process ends.

In this manner, by combining three incremental signals having different pitches, it is possible to generate other incremental signals having different pitches. By combining a plurality of incremental signals having different pitches acquired in a stopped state of the object to be controlled and performing the second encoding process, it is possible to calculate an absolute position with the resolution of the smallest pitch. After that, even when the first encoding process is executed continuously with the fixed resolution of the smallest pitch, the generated incremental position encoded value can be regarded as an absolute position encoded value.

Figure 6:
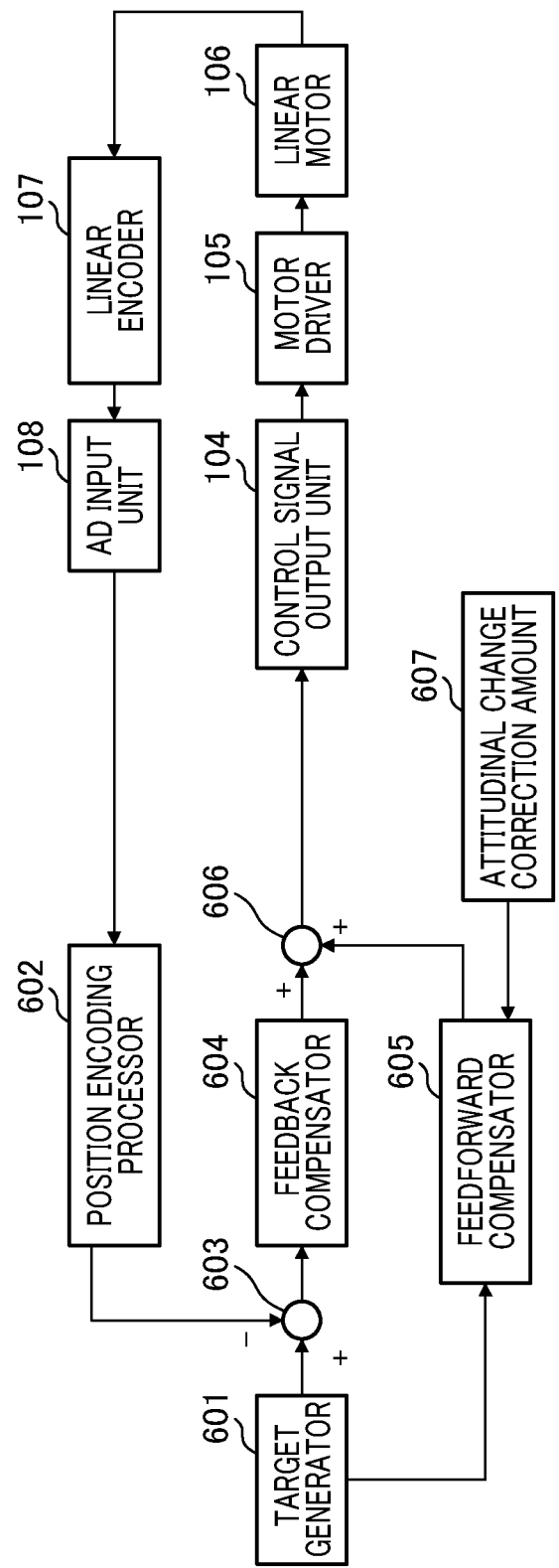
FIG. 6 is a block diagram according to a first embodiment of the present invention.

Next, a configuration of a control system will be described with reference to FIG. 6. FIG. 6 illustrates a block diagram of a control system according to the present embodiment. The same constituent elements as those of FIG. 1 will be denoted by the same reference numerals and the redundant description thereof will not be provided. Moreover, it is assumed that an adder performs an addition process and a subtraction process (addition of negative values).

The control signal output unit 104 receives a control amount designated from the CPU 101 and outputs a pulse-width modulation (PWM) signal converted according to a duty ratio to the motor driver 105 as a control signal. The motor driver 105 is an H-bridge driver, for example, and drives the linear motor 106 in a forward or backward direction according to the duty ratio of the PWM signal input as a control signal. The linear motor 106 is a voice coil motor, for example, and stops without producing thrust when the linear motor is at a horizontal attitude and the duty ratio is 50%. Moreover, the linear motor 106 generates maximum thrust in the forward direction when the duty ratio is 100% and generates maximum thrust in the backward direction when the duty ratio is 0%. Since the voice coil motor does not exert holding force when thrust is not generated, the voice coil motor moves in the direction of the force of gravity when its attitude is tilted. Thus, when the attitude changes to an attitude other than the horizontal attitude, even if the voice coil motor is stopped, position control of outputting a control amount for continuously producing thrust for the purpose of preventing a positional shift due to the force of gravity is performed.

The linear encoder 107 for detecting positions receives the moving amount of the linear motor 106 and converts the moving amount to a sine wave signal and a cosine wave signal (see FIG. 2A) and outputs the signals. The AD input unit 108 converts the sine wave signal and the cosine wave signal output by the linear encoder 107 to digital signals. The AD conversion value is output to a position encoding processor 602. The position encoding processor 602 converts the AD conversion value to a distance corresponding to the change in the sinusoidal wave form of the AD conversion value. The converted signal is output to the adder 603.

A target generator 601 generates a target value signal of the linear motor 106 and outputs the target value signal to the adder 603 and a feedforward (FF) compensator 605. The target value signal includes the information on a target velocity and target position that the linear motor 106 is to track. The adder 603 receives the target value signal output by the target generator 601 as a positive input and a present position signal output by the position encoding processor 602 as a negative input and calculates and outputs the difference between the signals. This difference is a position error of servo control. A feedback (FB) compensator 604 that forms a first calculator receives the position error output by the adder 603, generates a PID control amount, and outputs the PID control amount to the adder 606. Since PID (proportional-integral-derivative) control is a known technique, the detailed description thereof will not be provided.

The FF compensator 605 that forms a second calculator receives the target velocity signal output by the target generator 601, generates a feedforward control amount from a change in the target velocity (that is, necessary accelerating force), corrects an attitudinal change based on an attitudinal change correction amount, and outputs the feedforward control amount to the adder 606. The details of the FF compensator 605 will be described later with reference to FIG. 7.

The adder 606 adds the output of the FB compensator 604 and the output of the FF compensator 605. The addition result is output to the control signal output unit 104 as a total control amount. A storage unit 607 stores a correction amount (attitudinal change correction amount) for reducing a velocity difference occurring due to a difference in the moving direction even if an attitudinal change occurs when the FF compensator 605 generates a feedforward output value. A method of determining the attitudinal change correction amount stored in the storage unit 607 will be described later.

In this way, a servo control system for causing the position of the linear motor 106 to track the target value is formed.

Figure 7:
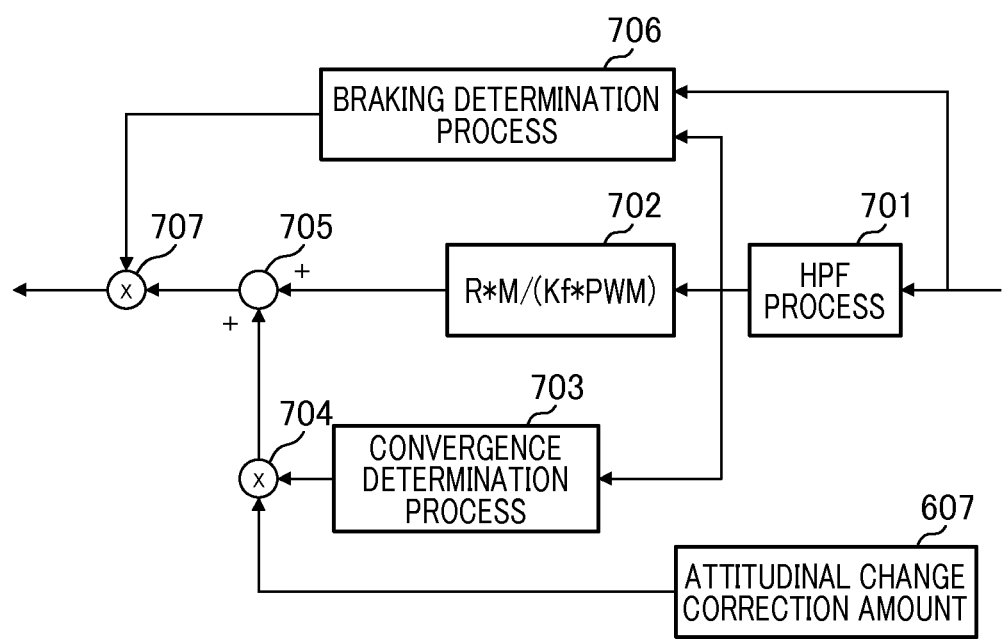
FIG. 7 is a block diagram of a feedforward compensator according to the first embodiment.

Next, the FF compensator 605 will be described in detail with reference to the block diagram of FIG. 7. Block 701 receives the target velocity output by the target generator 601 and performs a high-pass filter (HPF) process on the target velocity to convert the target velocity to velocity change information (that is, acceleration information). When a state in which the position is controlled to be at a fixed position and the velocity is controlled to a constant velocity based on predetermined HPF characteristics continues, the output of block 701 converges to 0. Block 702 converts the acceleration information to necessary control amount information which is derived from a design model of the linear motor 106. The model of the linear motor 106 includes a PWM bit resolution value, a resistance value R, mass information M, and a thrust conversion coefficient Kf. In block 703, a convergence determination process for determining whether or not the output of block 701 converges within a predetermined range is performed. Block 703 outputs "1" when the output of block 701 does not converge within the predetermined range and otherwise outputs "0". The present invention is not limited to outputting 0 or 1 as in the present embodiment, and values such as 1.5 or 0.5 may be output according to the degree (state) of convergence.

A multiplier 704 multiplies the attitudinal change correction amount and the output of block 703. For example, when the output of block 701 converges within the predetermined range, 0 is output as the multiplication result. This is to prevent a situation in which the force for correcting an attitudinal change is continuously applied to the object to be controlled when the feedforward force is not necessary. The adder 705 adds a necessary control amount which is the output of block 702 and the attitudinal change correction amount multiplied by the multiplier 704.

Block 706 determines whether the control state is an accelerating state or a braking state based on the target velocity and the output of block 701. Block 706 outputs "1" when the control state is not the braking state and outputs "0" when the control state is the braking state. The present invention is not limited to outputting 0 or 1 as in the present embodiment, and values such as 0.5 may be output when the control state is the braking state. The multiplier 707 multiplies the feedforward control amount corrected based on the attitudinal change correction amount and the output of block 706. For example, when the output of block 701 is the braking state, the output of block 706 is 0, and 0 is output as the multiplication result. Although the multiplier 707 is a unit for making the feedforward force effective only at the time of activation, the braking force may be made effective when it is desired to suppress overshoot.

In this manner, a block diagram of a first system (main system) that performs feedforward compensation and a block diagram of a second system (correction system) that corrects an attitudinal change form an entire block diagram. The main system is a feedforward compensation system that calculates a control amount necessary for allowing the linear motor 106 to generate a corresponding acceleration. The correction system is a system that corrects the attitudinal change until the control amount necessary for allowing the linear motor 106 to generate the corresponding acceleration converges within a predetermined range. Since the attitudinal change is corrected even when the attitude of the object to be controlled changes, a velocity difference occurring due to a difference in the moving direction (driving direction) is smaller than that when the attitudinal change is not taken into consideration. The adder 606 of FIG. 6 adds the PID control amount and the feedforward control amount and outputs an addition result to the control signal output unit 104. Thus, it is possible to improve the ability to track the velocity during activation from the stopped state, which cannot be completely compensated by the control of the FB compensator 604 only.

In the present embodiment, a PID controller is used as the FB compensator 604. Thus, even when the target velocity is zero and the position is being controlled to be at a fixed position, a control amount that resists the force of gravity is accumulated as an I-control component and output. The FB compensator 604 is not particularly limited to the PID controller but an arbitrary controller may be used as long as the controller can be used in combination with the FF compensator 605.

Next, with reference to FIGS. 6 to 10, a process of determining an attitudinal change correction amount in relation to a feedforward control amount that enables the possibility of a velocity difference occurring due to a difference in the moving direction to be suppressed even if the attitude of the object to be controlled changes will be described.

Figure 8:
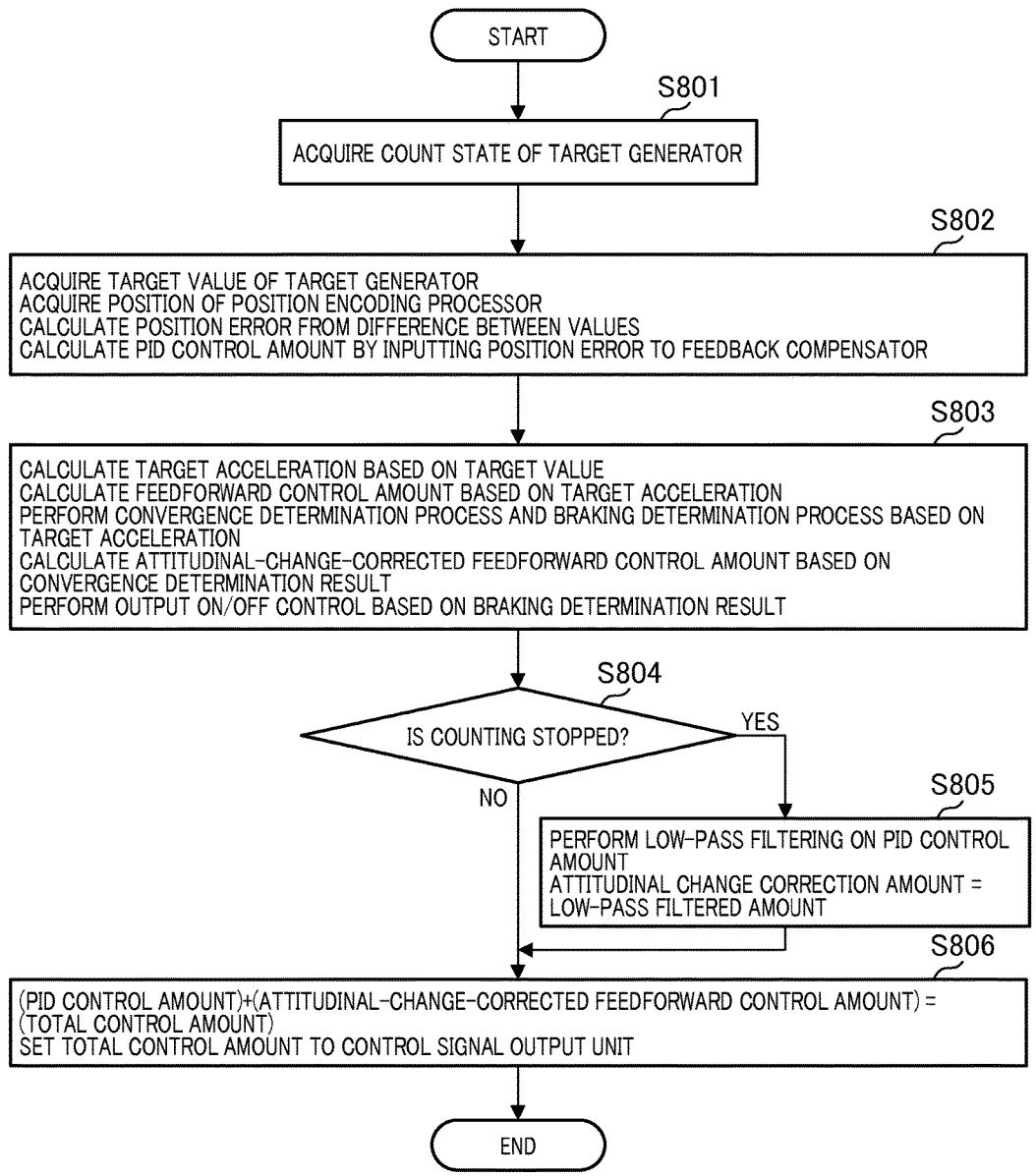
FIG. 8 is a flowchart illustrating the processes of the first embodiment.

FIG. 8 is a flowchart illustrating a position control process executed by the CPU 101 in the block diagram of FIG. 6. In S801 of FIG. 8, the CPU 101 acquires a count state indicating whether the target generator 601 is incrementing or decrementing the count of a target value or stops counting. The count being incremented or decremented means that the target velocity is not 0 and it is instructed to perform position control of causing the object to be controlled to track a target movement. Moreover, the stopped counting means that the target velocity is 0 and it is instructed to perform position control of causing the object to be controlled to stop at a fixed position continuously. In S802, the CPU 101 acquires the target value output by the target generator 601 and the present position processed by the position encoding processor 602 and calculates a position error from the difference between the target value and the present position with the aid of the adder 603. The FB compensator 604 receives the position error and calculates a PID control amount based on the position error. In S803, the CPU 101 calculates a target acceleration from the target velocity output by the target generator 601. This process corresponds to block 701 of FIG. 7. Subsequently, the CPU 101 calculates a feedforward control amount from the target acceleration. This process corresponds to block 702. Subsequently, the CPU 101 performs a convergence determination process based on the target acceleration. This process corresponds to block 703. Further, the CPU 101 performs a braking determination process based on the target acceleration and the target velocity. This process corresponds to block 706. After that, the multiplier 704 multiplies the attitudinal change correction amount by a predetermined coefficient based on the result of the convergence determination process, and the adder 705 calculates an attitudinal-change-corrected feedforward control amount. Lastly, the multiplier 707 turns the feedforward output on and off according to the result of the braking determination process. In S804, the CPU 101 determines whether or not the target generator 601 stops counting. When the counting is stopped, the process proceeds to S805. When the count is being incremented or decremented, the process proceeds to S806.

In S805, the CPU 101 performs a low-pass filter process of extracting an attitudinal change correction amount that changes at a predetermined frequency or lower from the present PID control amount calculated in S802. For example, a camera lens position control device will be described as an application example of the position control device. According to a photographing technique called tilting, since a user sweeps a camera in a vertical direction slowly, an attitudinal change of the camera occurs. Moreover, when a user performs close-up photographing by approaching a subject such as a flower on the ground as close as possible, since the camera takes an upward or downward attitude for a long period, an attitudinal change occurs. The camera attitude changes at a low cycle of several seconds during photographing whereas driving and stopping are repeated at a high cycle of several milliseconds during position control. That is, it can be said that a control amount that changes at a high cycle of several milliseconds is a control amount for position control whereas a control amount that changes at a low cycle of several seconds is a control amount for resisting an attitudinal change. In the case of a camera lens position control device, the cutoff frequency of the low-pass filter (LPF) process is preferably set between the former cycle and the latter cycle (for example, to approximately several hundreds of milliseconds). Subsequently, the CPU 101 sets an amount obtained after passing through a low-pass filter (LPF) as the attitudinal change correction amount for the next feedforward control.

For example, a case in which driving and stopping are repeated in a state in which the attitude of the object to be controlled is in a horizontal state will be considered. When the LPF process is performed on the PID control amount in the counting-stopped state at a cutoff frequency sufficiently lower than the driving and stopping cycle, since a control amount for resisting the attitudinal change is not included, a positional shift tracking control amount within the driving and stopping cycle is blocked by the filter. That is, the output becomes zero and the duty ratio becomes 50%. Moreover, a case in which driving and stopping are repeated in a state in which the attitude of the object to be controlled is in a tilt state other than the horizontal state will be considered. When the LPF process is performed similarly on the PID control amount in the counting-stopped state, the positional shift tracking control amount within the driving and stopping cycle is blocked by the filter. Thus, a control amount for resisting the attitudinal change can be extracted as a duty ratio other than 50%. In this manner, a control amount necessary for resisting the force of gravity in a stopped state of the object to be controlled is stored in the storage unit 607 as the attitudinal change correction amount.

When it is determined in S804 that the counting is not stopped or after S805 is performed, the process proceeds to S806 and the adder 606 adds the PID control amount and the attitudinal-change-corrected feedforward control amount to calculate a total control amount. The total control amount is output from the adder 606 to the control signal output unit 104, and the process ends. In S805, the LPF process of extracting an attitudinal change correction amount that changes at a predetermined frequency or lower from the present PID control amount is performed. The present invention is not limited to this, and the same LPF process may be executed on the total control amount calculated in S806. In this case, since the control amount other than the PID control amount in the counting-stopped state is "0", the same value is extracted.

As described above, even when such an attitudinal change of the object to be controlled occurs, the LPF process is performed on the PID control amount output by the FB compensator 604 in the counting-stopped state (that is, when the position is controlled to be at a fixed position) or the total control amount including the control amount. Data indicating the control amount after the LPF process is performed is stored in the storage unit 607 as the attitudinal change correction amount.

Figure 9:
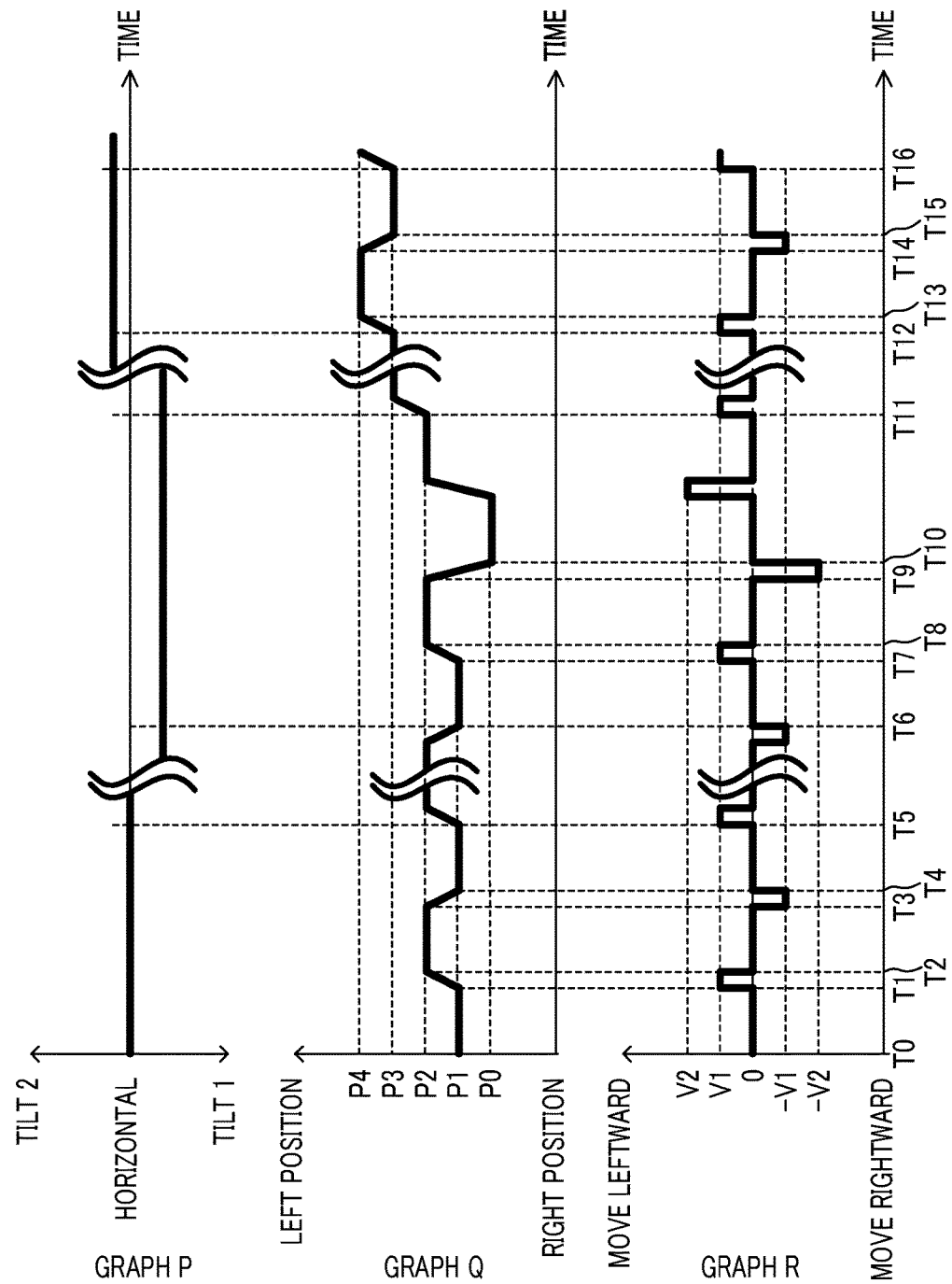
FIG. 9 is a diagram illustrating examples of operation targets in the first embodiment.

FIG. 9 is a timing chart illustrating operation target examples of position control in detail. The horizontal axis of graph P is a time axis and the vertical axis represents an attitude of a object to be controlled in which the center indicates a horizontal state. The horizontal axis of graph Q is a time axis and the vertical axis represents a target position (see P0 to P4). The horizontal axis of graph R is a time axis (see time T0 to T16) and the vertical axis represents a target velocity (see −V2 to V2 (|V2|>|V1|)). FIG. 10 is a diagram illustrating examples of numerical changes during the operation. The following items are illustrated in the rows (1) to (20) as patterns of different moving directions.

(A) Time or period: Indicates the time or period from T0 to T16

(B) Attitude: Indicates any one of three attitudes of Horizontal, Tilt 1, and Tilt 2

(C) Moving direction: Indicates any one of a stopped state, leftward movement, rightward movement, leftward movement at a constant velocity, and rightward movement at a constant velocity (D) PID control amount: Indicates zero, a positive value, or a negative value (E) FF (Feedforward) control amount: Indicates zero, a positive value, or a negative value (F) Attitudinal change correction amount: Indicates zero, a positive value, or a negative value (G) Attitudinal-change-corrected FF control amount: Indicates zero, a positive value, or a negative value (H) Total control amount: Indicates zero, a positive value, or a negative value Regarding (C) Moving direction of the object to be controlled, the first direction is defined as the leftward direction and the second direction is defined as the rightward direction for the sake of convenience.

The object to be controlled is at a horizontal attitude in the period between T0 and T5 or later in graph P. This period corresponds to the period illustrated in the rows (1) to (7) in FIG. 10. In the period between T0 to T1, the object to be controlled is in a state of tracking a target stop value indicated by the position P1 in graph Q. As illustrated in the row (1) of FIG. 10, the control amount obtained by passing (D) PID control amount (the output of the FB compensator 604) through the LPF process is "0", and this value is (F) Attitudinal change correction amount. The value "0" is stored in the storage unit 607 as the attitudinal change correction amount. As for (E) FF control amount (the output of block 702), no acceleration is generated in a stopping zone. That is, since "0" is output as the FF control amount, (G) Attitudinal-change-corrected FF control amount (the output of the adder 705) is "0" regardless of (F) Attitudinal change correction amount. (H) Total control amount (the output of the adder 606) is calculated as "0" based on (D) PID control amount "0" and (G) Attitudinal-change-corrected FF control amount "0". That is, the value output to the control signal output unit 104 is "0".

Subsequently, it is assumed that the object to be controlled has started moving at the velocity V1 in graph R from the target stop value P1 to the value P2 illustrated in graph Q. The respective items at time T1 are illustrated in the row (2) of FIG. 10. As for (E) FF control amount, "15" is calculated as the control amount necessary for generating acceleration. Since (F) Attitudinal change correction amount is "0" at time T1, a control amount "15+0=15" necessary for accelerating from the velocity 0 to the velocity V1 is output as (G) Attitudinal-change-corrected FF control amount. The value "15" is output to the control signal output unit 104 as (H) Total control amount based on (D) PID control amount "0" and (G) Attitudinal-change-corrected FF control amount "15".

The respective items in a period (that is, the period between T1 to T2) in which the object to be controlled moves at the velocity V1 in graph R from the target stop value P1 to the value P2 illustrated in graph Q are illustrated in the row (3) of FIG. 10. It is assumed that (D) PID control amount is the control amount "10" for tracking the target position. (E) FF control amount is the control amount "0" that does not generate acceleration in a constant velocity zone, and (G) Attitudinal-change-corrected FF control amount is "0" regardless of (F) Attitudinal change correction amount. The value "10" is output to the control signal output unit 104 as (H) Total control amount based on (D) PID control amount "10" and (G) Attitudinal-change-corrected FF control amount "0".

The respective items in a period (that is, the period between T2 and T3) in which the object to be controlled tracks the target stop value P2 illustrated in graph Q are illustrated in the row (4) of FIG. 10. The control amount obtained by passing (D) PID control amount through the LPF process is "0", and (F) Attitudinal change correction amount is "0". The value "0" is stored in the storage unit 607 as the attitudinal change correction amount. (E) FF control amount is the control amount "0" that does not generate acceleration in a stopping zone, and (G) Attitudinal-change-corrected FF control amount is "0" regardless of (F) Attitudinal change correction amount. The value "0" is calculated as (H) Total control amount based on (D) PID control amount "0" and (G) Attitudinal-change-corrected FF control amount "0".

It is assumed that the object to be controlled has started moving in a backward direction at the velocity "−V1" in graph R from the target stop value P2 to the value P1 illustrated in graph Q. The respective items at time T3 are illustrated in the row (5) of FIG. 10. It is assumed that a control amount "−15" necessary for generating an acceleration is calculated as (E) FF control amount. Since (F) Attitudinal change correction amount is "0" at time T3, the control amount "−15+0=−15" necessary for changing the velocity from 0 to −V1 is calculated as (G) Attitudinal-change-corrected FF control amount. The value "−15" is output to the control signal output unit 104 as (H) Total control amount based on (D) PID control amount "0" and (G) Attitudinal-change-corrected FF control amount "−15".

The respective items in a period (that is, the period between T3 and T4) in which the object to be controlled moves at the velocity "−V1" in graph R from the target stop value P2 to the value P1 illustrated in graph Q are illustrated in the row (6) of FIG. 10. It is assumed that (D) PID control amount is the control amount "−10" for tracking the target position. (E) FF control amount is the control amount "0" that does not generate acceleration in a constant velocity zone, and (G) Attitudinal-change-corrected FF control amount is "0" regardless of (F) Attitudinal change correction amount. The value "−10" is output to the control signal output unit 104 as (H) Total control amount based on (D) PID control amount "−10" and (G) Attitudinal-change-corrected FF control amount "0".

The respective items in the period between T4 and T5 in which the object to be controlled tracks the target stop value P1 illustrated in graph Q are illustrated in the row (7) of FIG. 10. Similarly to the case of (1), (D) PID control amount is "0", and the value "0" is stored in the storage unit 607 as (F) Attitudinal change correction amount. (E) FF control amount is the control amount "0" that does not generate acceleration in a stopping zone. Regardless of (F) Attitudinal change correction amount, (G) Attitudinal-change-corrected FF control amount is "0" and (H) Total control amount is "0".

In the period between T6 or earlier and T11 or later in graph P, the attitude of the object to be controlled is in the Tilt 1 state. This period corresponds to the periods illustrated in the rows (8) to (14) in FIG. 10. In this period, the respective items in the period between T6 and T7 in which the object to be controlled tracks the target stop value P1 illustrated in graph Q are illustrated in the row (8) of FIG. 10. The control amount obtained by passing (D) PID control amount through the LPF process is "−10", and (F) Attitudinal change correction amount "−10" is stored in the storage unit 607. Since (E) FF control amount is the control amount "0" that does not generate acceleration in a stopping zone, (G) Attitudinal-change-corrected FF control amount is "0" regardless of (F) Attitudinal change correction amount. The value "−10" is output to the control signal output unit 104 as (H) Total control amount based on (D) PID control amount "−10" and (G) Attitudinal-change-corrected FF control amount "0".

It is assumed that the object to be controlled has started moving at the velocity V1 in graph R from the target stop value P1 to the value P2 illustrated in graph Q. The respective items at time T7 are illustrated in the row (9) of FIG. 10. It is assumed that a control amount "15" necessary for generating acceleration is calculated as (E) FF control amount. Since (F) Attitudinal change correction amount is "−10" at time T7, the control amount "15−10=5" necessary for changing the velocity from 0 to V1 is calculated as (G) Attitudinal-change-corrected FF control amount. The value "5" is output to the control signal output unit 104 as (H) Total control amount based on (D) PID control amount "−10" and (G) Attitudinal-change-corrected FF control amount "5".

The respective items in a period (that is, the period between T7 and T8) in which the object to be controlled moves at the velocity V1 in graph R from the target stop value P1 to the value P2 illustrated in graph Q are illustrated in the row (10) of FIG. 10. It is assumed that (D) PID control amount is the control amount "0" for tracking the target position. Since (E) FF control amount is the control amount "0" that does not generate acceleration in a constant velocity zone, (G) Attitudinal-change-corrected FF control amount is "0" regardless of (F) Attitudinal change correction amount "−10". The value "0" is calculated as (H) Total control amount based on (D) PID control amount "0" and (G) Attitudinal-change-corrected FF control amount "0".

The respective items in the period between T8 and T9 in which the object to be controlled tracks the target stop value P2 illustrated in graph Q are illustrated in the row (11) of FIG. 10. The control amount obtained by passing (D) PID control amount through the LPF process, "−10", is stored in the storage unit 607 as (F) Attitudinal change correction amount. Since (E) FF control amount is the control amount "0" that does not generate acceleration in a stopping zone, (G) Attitudinal-change-corrected FF control amount is "0" regardless of (F) Attitudinal change correction amount "−10". The value "−10" is output to the control signal output unit 104 as (H) Total control amount based on (D) PID control amount "−10" and (G) Attitudinal-change-corrected FF control amount "0".

It is assumed that the object to be controlled has started moving at the velocity "−V2" in graph R from the target stop value P2 to the value P0 illustrated in graph Q. The respective items at time T9 are illustrated in the row (12) of FIG. 10. It is assumed that, at time T9, the control amount "−30" necessary for generating acceleration is calculated as (E) FF control amount. Since (F) Attitudinal change correction amount is "−10", the control amount "−30−10=−40" necessary for changing the velocity from 0 to −V2 is calculated as (G) Attitudinal-change-corrected FF control amount. The value "−50" is output to the control signal output unit 104 as (H) Total control amount based on (D) PID control amount "−10" and (G) Attitudinal-change-corrected FF control amount "−40".

The respective items in a period (that is, the period between T9 and T10) in which the object to be controlled moves at the velocity "−V2" in graph R from the target stop value P2 to the value P0 illustrated in graph Q are illustrated in the row (13) of FIG. 10. It is assumed that (D) PID control amount is the control amount "−30" for tracking the target position. Since (E) FF control amount is the control amount "0" that does not generate acceleration in a constant velocity zone, (G) Attitudinal-change-corrected FF control amount is "0" regardless of (F) Attitudinal change correction amount "−10". The value "−30" is output to the control signal output unit 104 as (H) Total control amount based on (D) PID control amount "−30" and (G) Attitudinal-change-corrected FF control amount "0".

The respective items in the period immediately before T11 in graph R in which the object to be controlled tracks the target stop value P2 illustrated in graph Q are illustrated in the row (14) of FIG. 10. Similarly to the case of (8), (D) PID control amount is "−10" and (F) Attitudinal change correction amount "−10" is stored in the storage unit 607. Since (E) FF control amount is "0", (G) Attitudinal-change-corrected FF control amount is "0" regardless of (F) Attitudinal change correction amount "−10". The value "−10" is output to the control signal output unit 104 as (H) Total control amount based on (D) PID control amount "−10" and (G) Attitudinal-change-corrected FF control amount "0".

In the period between T12 or earlier and T16 or later illustrated in graph P, the attitude of the object to be controlled is Tilt 2. Tilt 2 is a state of being tilted in the backward direction in relation to Tilt 1. This period corresponds to the period illustrated in the rows (15) to (20) in FIG. 10. It is assumed that in the period immediately before T12 in graph R in which the object to be controlled tracks the target stop value P3 illustrated in graph Q, the control amount "5" obtained by passing the PID control amount through the LPF process is the attitudinal change correction amount, and this value is stored in the storage unit 607.

It is assumed that the object to be controlled has started moving at the velocity V1 in graph R from the target stop value P3 to the value P4 illustrated in graph Q. The respective items at time T12 are illustrated in the row (15) of FIG. 10. It is assumed that the control amount "15" necessary for generating acceleration is calculated as (E) FF control amount. Since (F) Attitudinal change correction amount is "5", the control amount "15+5=20" necessary for accelerating the velocity from 0 to V1 is calculated as (G) Attitudinal-change-corrected FF control amount. The value "25" is output to the control signal output unit 104 as (H) Total control amount based on (D) PID control amount "5" and (G) Attitudinal-change-corrected FF control amount "20".

The respective items in a period (that is, the period between T12 and T13) in which the object to be controlled moves at the velocity V1 in graph R from the target stop value P3 to the value P4 illustrated in graph Q are illustrated in the row (16) of FIG. 10. It is assumed that (D) PID control amount is the control amount "15" for tracking the target position. Since (E) FF control amount is the control amount "0" that does not generate acceleration in a constant velocity zone, (G) Attitudinal-change-corrected FF control amount is "0" regardless of (F) Attitudinal change correction amount "5". The value "15" is output to the control signal output unit 104 as (H) Total control amount based on (D) PID control amount "15" and (G) Attitudinal-change-corrected FF control amount "0".

The respective items in the period between T13 and T14 in graph R in which the object to be controlled tracks the target stop value P4 illustrated in graph Q are illustrated in the row (17) of FIG. 10. The control amount obtained by passing (D) PID control amount through the LPF process, "5", is stored in the storage unit 607 as (F) Attitudinal change correction amount. Since (E) FF control amount is the control amount "0" that does not generate an acceleration in a stopping zone, (G) Attitudinal-change-corrected FF control amount is "0" regardless of (F) Attitudinal change correction amount "5". The value "5" is output to the control signal output unit 104 as (H) Total control amount based on (D) PID control amount "5" and (G) Attitudinal-change-corrected FF control amount "0".

It is assumed that the object to be controlled has started moving at the velocity "−V1" in graph R from the target stop value P4 to the value P3 illustrated in graph Q. The respective items at time T14 are illustrated in the row (18) of FIG. 10. It is assumed that the control amount "−15" necessary for generating acceleration is calculated as (E) FF control amount. Since (F) Attitudinal change correction amount is "5", the control amount "−15+5=−10" necessary for changing the velocity from 0 to −V1 is calculated as (G) Attitudinal-change-corrected FF control amount. The value "−5" is output to the control signal output unit 104 as (H) Total control amount based on (D) PID control amount "5" and (G) Attitudinal-change-corrected FF control amount "−10".

The respective items in a period (that is, the period between T14 and T15) in which the object to be controlled moves at the velocity "−V1" in graph R from the target stop value P4 to the value P5 illustrated in graph Q are illustrated in the row (19) of FIG. 10. It is assumed that (D) PID control amount is the control amount "−5" for tracking the target position. Since (E) FF control amount is the control amount "0" that does not generate acceleration in a constant velocity zone, (G) Attitudinal-change-corrected FF control amount is "0" regardless of (F) Attitudinal change correction amount "5". The value "−5" is output to the control signal output unit 104 as (H) Total control amount based on (D) PID control amount "−5" and (G) Attitudinal-change-corrected FF control amount "0".

The respective items in the period between T15 and T16 in graph R in which the object to be controlled tracks the target stop value P3 illustrated in graph Q are illustrated in the row (20) of FIG. 10. Similarly to the case of (17), (D) PID control amount is "5" and (F) Attitudinal change correction amount "5" is stored in the storage unit 607. Since (E) FF control amount is "0", (G) Attitudinal-change-corrected FF control amount is "0" regardless of (F) Attitudinal change correction amount "5". The value "5" is output to the control signal output unit 104 as (H) Total control amount based on (D) PID control amount "5" and (G) Attitudinal-change-corrected FF control amount "0".

Although an attitudinal change of the object to be controlled during the feedforward control becomes the cause of a velocity difference between the forward moving velocity and the backward moving velocity, the velocity difference can be suppressed in the present embodiment. This results from the effect of the process of adding low-frequency components of the attitudinal change correction amount in the stopping period to the feedforward control amount. That is, in the present embodiment, the velocity difference occurring due to a difference in the moving direction (driving direction) is smaller than that when an attitudinal change is not taken into consideration.

In the present embodiment, a feedback control amount output to resist an attitudinal change of the object to be controlled during the position control of controlling the position to be at a fixed position is stored in the storage unit. Moreover, during feedforward control of causing the velocity of the object to be controlled to track the target velocity, a feedforward output is corrected based on the attitudinal change correction amount stored in the storage unit. Since the output is corrected based on the control amount for balancing against the attitudinal change of the object to be controlled, the possibility of a velocity difference occurring due to a difference in the moving direction can be suppressed by the feedforward output even when the attitude of the object to be controlled changes. Therefore, it is possible to stabilize position servo control.

Second Embodiment

Next, a second embodiment of the present invention will be described. In the present embodiment, the output of a feedback compensator when the target velocity is 0 and the position is being controlled to be at a fixed position is stored as an attitudinal change correction amount. During feedforward control, a feedforward output is corrected based on the stored attitudinal change correction amount, and the disturbance estimation observer subtracts the stored attitudinal change correction amount from a total control amount to perform disturbance estimation. The same constituent elements as those of the first embodiment will be denoted by the same reference numerals. Moreover, the detailed description thereof will not be provided, and differences will be mainly described.

Figure 11:
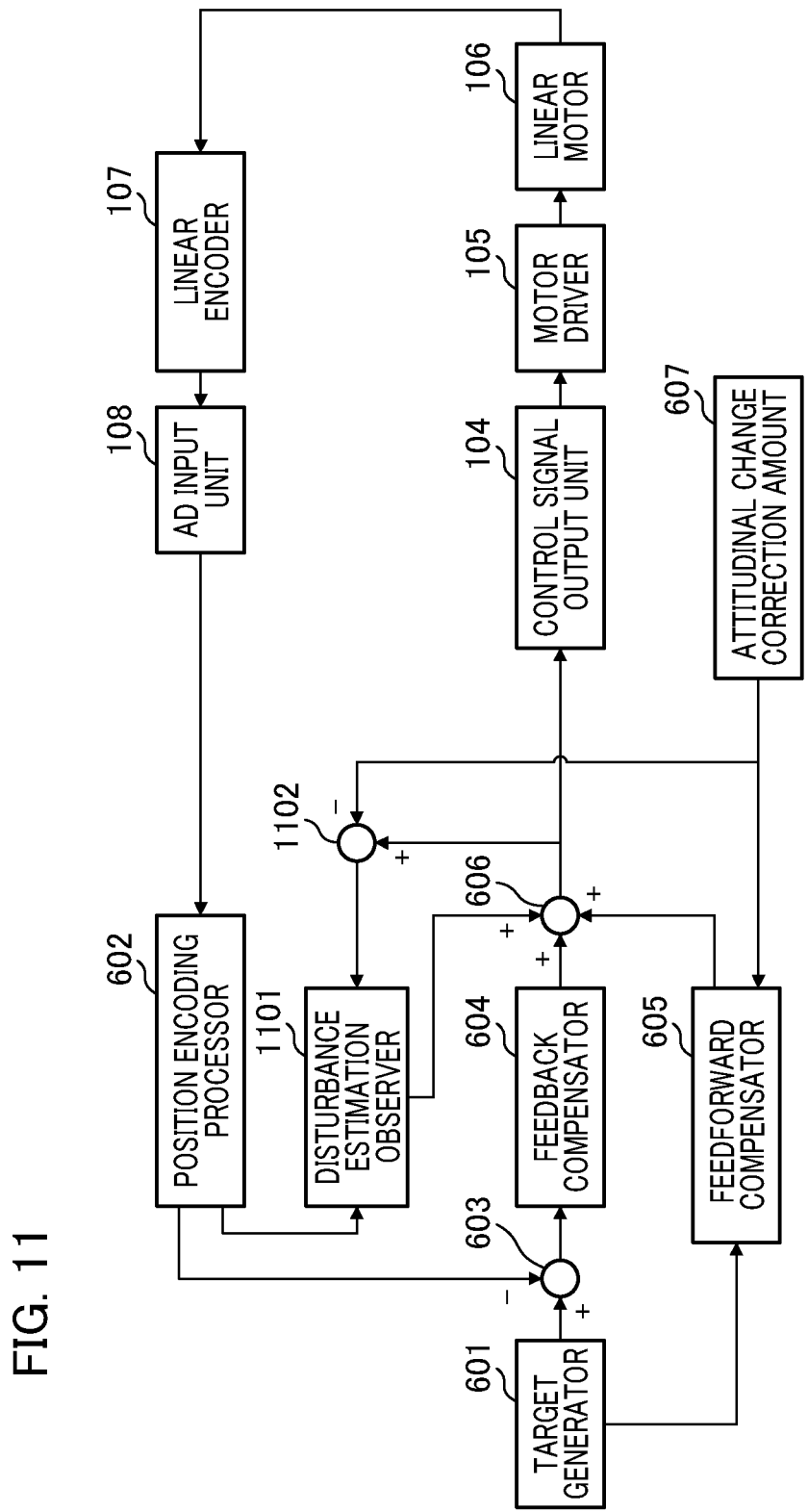
FIG. 11 is a block diagram according to a second embodiment of the present invention.

FIG. 11 illustrates a block diagram of a control system according to the present embodiment. It is assumed that an adder performs an addition process and a subtraction process (addition of negative values).

The position encoding processor 602 converts the AD conversion value to a distance corresponding to the change in the sinusoidal wave form of the AD conversion value. The converted signal is output to the adder 603 and a disturbance estimation observer 1101.

The storage unit 607 stores the attitudinal change correction amount. The attitudinal change correction amount is used for subtracting a control amount for resisting an attitudinal change from the total control amount during disturbance estimation of the disturbance estimation observer 1101. Moreover, the attitudinal change correction amount is used as a correction amount for decreasing a velocity difference occurring in the moving direction even when an attitudinal change occurs when the FF compensator 605 generates a feedforward output value. A method of determining the attitudinal change correction amount stored in the storage unit 607 will be described later. An adder 1102 receives the total control amount output by the adder 606 as a positive input and the attitudinal change correction amount stored in the storage unit 607 as a negative input and subtracts the attitudinal change correction amount from the total control amount. The subtraction result is output to the disturbance estimation observer 1101.

The disturbance estimation observer 1101 receives the output of the adder 1102 and the output of the position encoding processor 602. The disturbance estimation observer 1101 performs disturbance estimation based on the difference between the control amount applied to the linear motor 106 and the actual velocity of the object to be controlled. The disturbance estimation observer 1101 generates a disturbance canceling control amount corresponding to the estimated disturbance and outputs the disturbance canceling control amount to the adder 606. The details of the disturbance estimation observer 1101 will be described later with reference to FIGS. 12 and 13.

The adder 606 adds the PID control amount output by the FB compensator 604, the disturbance canceling control amount output by the disturbance estimation observer 1101, and the feedforward output of the FF compensator 605. The sum of the three outputs is output to the control signal output unit 104 and the adder 1102 as a total control amount.

In this way, a servo control system that causes the position of the linear motor 106 to track the target value is formed.

Figure 12:
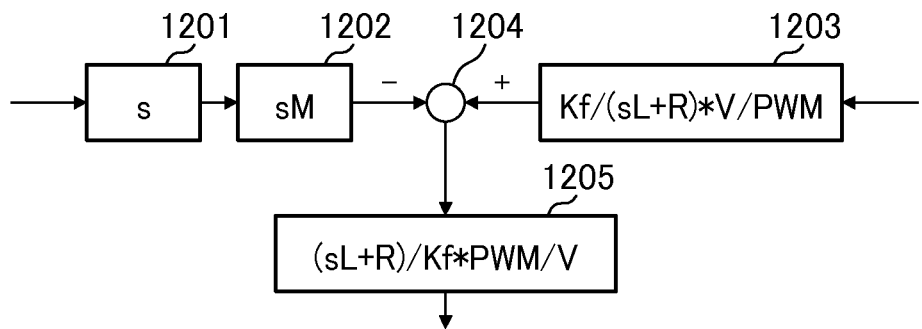
FIG. 12 is a block diagram of a disturbance estimation observer according to the second embodiment.

Next, the configuration of the disturbance estimation observer 1101 will be described in detail with reference to the block diagram of FIG. 12. In the drawing, "s" indicates the Laplace variable.

Block 1201 differentiates the position information output by the position encoding processor 602 to convert the position information to velocity information.

Block 1202 converts the velocity information output from block 1201 to actual thrust information indicating the actual output of the linear motor 106 from a motion equation of mass information M and the acceleration information obtained by differentiating the velocity information. Since the actual thrust information is calculated from a movement (that is, a velocity) between control samples, in principle, the actual thrust information is zero when the target velocity is zero and the position is being controlled to be at a fixed position.

Block 1203 converts the control amount output by the adder 1102 to thrust information which is derived from a design model of the linear motor 106. The model of the linear motor 106 includes a PWM bit resolution value, a motor supply voltage V, a resistance value R, a reactance value L, and a thrust conversion coefficient Kf, and the resistance value R and the reactance value L are included as the element "$1/(sL+R)$". Since the thrust information is calculated from the control amount applied to the linear motor 106, in principle, even when the target velocity is zero and the position is being controlled to be at a fixed position, when a control amount for resisting the force of gravity is applied, the control amount is converted to a corresponding thrust.

The adder 1204 converts a difference between the actual thrust information and the thrust information derived from the design model of the linear motor 106 to a disturbance estimation result as a disturbance thrust loss. Since this difference becomes disturbance thrust, if the total control amount is used without taking the attitudinal change into consideration in the disturbance estimation during the position control of causing a tilted object to be controlled to track a target movement, the total control amount does not contribute to a velocity change, and the entire control amount for resisting the force of gravity is regarded as disturbance thrust. Therefore, in the present embodiment, the adder 1102 performs a process of subtracting the control amount applied to the linear motor 106 in order to resist the force of gravity due to an attitudinal change from the total control amount as an attitudinal change correction amount so that the control amount is not used for the disturbance estimation.

Block 1205 converts the disturbance estimation result output from the adder 1204 to a disturbance canceling control amount for generating thrust corresponding to the disturbance estimation result based on an inverse model of the linear motor 106. The inverse model of the linear motor 106 includes the inverse values of the PWM bit resolution value, the motor supply voltage V, and the thrust conversion coefficient Kf included in the model of the linear motor 106 illustrated in block 1203, and the resistance value R and the reactance value L are included as the element "sL+R".

In this manner, the disturbance estimation observer 1101 that estimates disturbance from the control amount applied to the linear motor 106 and the moving amount of the object to be controlled and outputs a disturbance canceling control amount for cancelling the disturbance as a thrust loss is formed.

By allowing the adder 606 to add three control amounts and output the addition results to the control signal output unit 104, it is possible to cancel a disturbance such as individual characteristic differences and temporal changes of a linear motor control system which cannot be completely compensated by the control of the FF compensator 605 and the FB compensator 604. In the present embodiment, a PID controller is used as the FB compensator 604. Thus, even when the target velocity is zero and the position is being controlled to be at a fixed position, a control amount that resists the force of gravity is accumulated as an I-control component and output. The FB compensator 604 is not particularly limited to the PID controller but an arbitrary controller may be used as long as the controller can be used in combination with the FF compensator 605 and the disturbance estimation observer 1101.

Next, a process of determining the feedforward control amount and the attitudinal change correction amount will be described with reference to FIG. 7 and FIGS. 12 to 15. According to this process, it is possible to suppress the possibility of a velocity difference occurring due to a difference in the moving direction even if the attitude of the object to be controlled changes and to suppress the possibility of there being an error in the estimated state amount.

Figure 13:
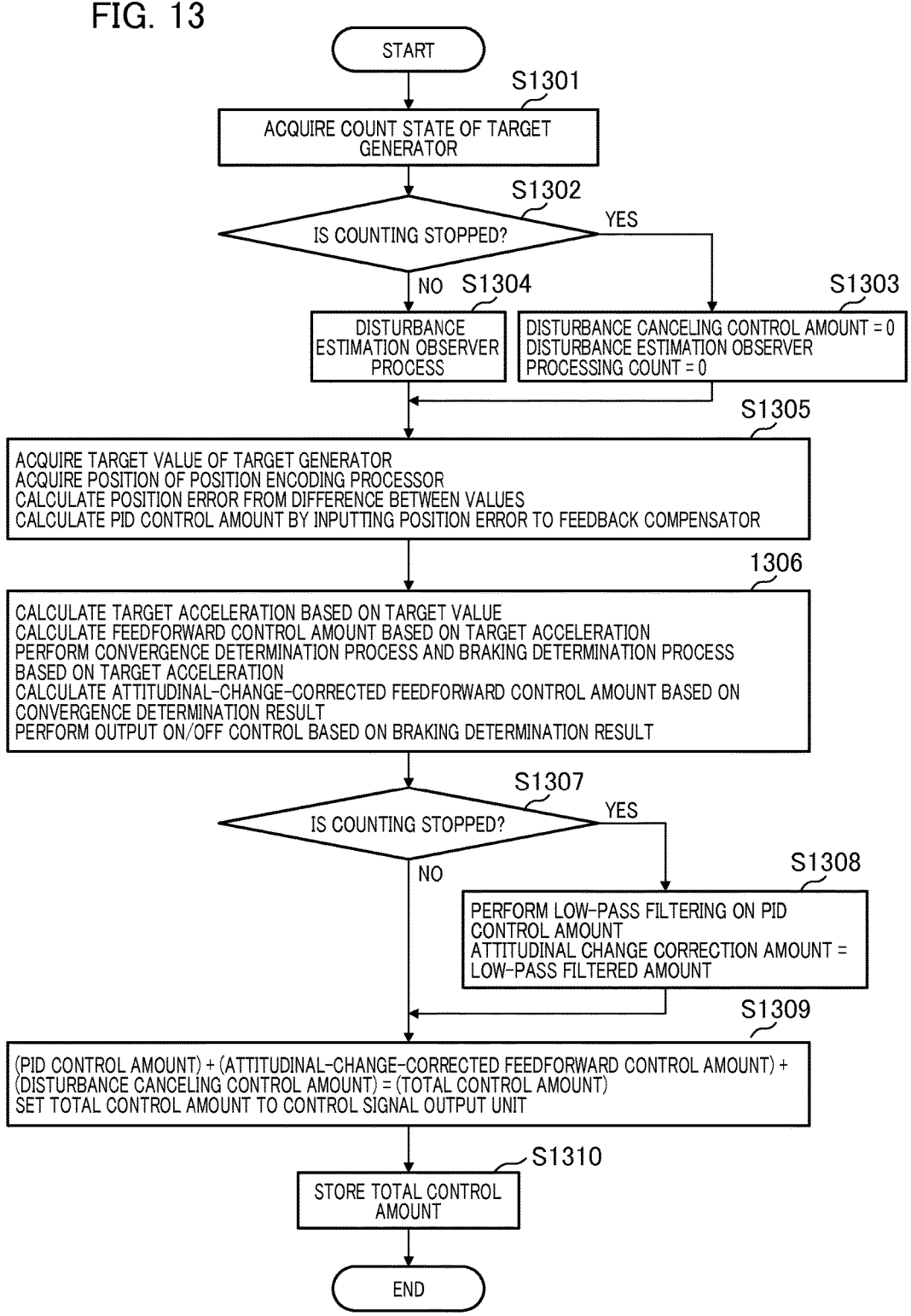
FIG. 13 is a flowchart illustrating the processes of the second embodiment.
Figure 14:
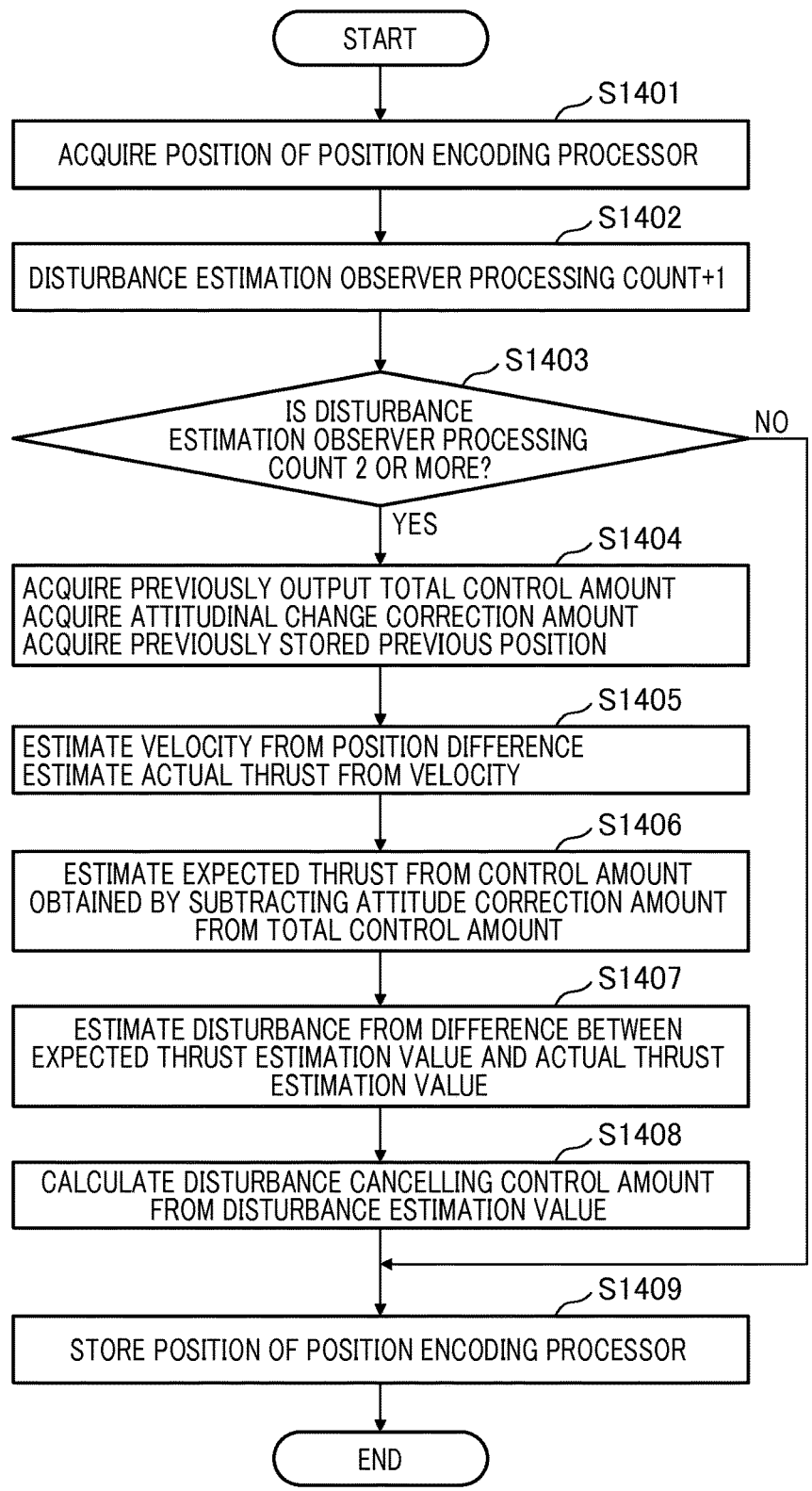
FIG. 14 is a flowchart illustrating the processes of the disturbance estimation observer of the second embodiment.

FIG. 13 is a flowchart illustrating the position control process that the CPU 101 executes in the block diagram of FIG. 11. FIG. 14 is a flowchart illustrating the process of the disturbance estimation observer illustrated in S1304 of FIG. 13 in detail.

The processes of S1301, S1305, S1306, S1307, and S1308 in FIG. 13 are the same as the processes of S801, S802, S803, S804, and S805 in FIG. 8, respectively. Thus, the differences will be described below.

In S1301 of FIG. 13, the CPU 101 acquires a count state. After that, in S1302, it is determined whether or not the target generator 601 stops counting. When the counting is stopped, the process proceeds to S1303. When the count is being incremented or decremented, the process proceeds to S1304.

In S1303, the CPU 101 sets the disturbance canceling control amount to 0 and sets a disturbance estimation observer processing count (hereinafter referred to simply as a processing count) to 0. In principle, when the target velocity is 0 and the position is being controlled to be at a fixed position, since the actual thrust information is 0 and it is not possible to estimate a disturbance, the disturbance canceling control amount is set to 0. That is, the disturbance estimation observer 1101 is substantially in the OFF state. In S1304, the CPU 101 allows the disturbance estimation observer 1101 to execute a disturbance estimation observer process. The details of the disturbance estimation observer process will be described later with reference to FIG. 14.

After S1303 or S1304 is performed, the process proceeds to S1305 and the CPU 101 further executes S1306. Then, the flow branches into S1308 or S1309 based on the determination of S1307. When it is determined in S1307 that the counting is stopped, the process proceeds to S1308 and the CPU 101 performs an LPF process of extracting an attitudinal change correction amount and sets the amount obtained after passing through the LPF as the attitudinal change correction amount for the next feedforward control and the next disturbance estimation observer process.

When it is determined in S1307 that the counting is not stopped or after S1308 is performed, the process proceeds to S1309 and the adder 606 adds the PID control amount, the attitudinal-change-corrected feedforward control amount, and the disturbance canceling control amount to calculate a total control amount. The total control amount is output to the adder 606 and the control signal output unit 104. In S1310, the CPU 101 stores the total control amount for the next disturbance estimation observer process in the RAM 103 and the process ends.

As described above, even when an attitudinal change of the object to be controlled occurs, the amount obtained by passing the PID control amount output by the FB compensator 604 through the LPF process in the counting-stopped state (that is, when the position is controlled to be at a fixed position) is stored in the storage unit 607 as the attitudinal change correction amount.

Next, the disturbance estimation observer process illustrated in S1304 of FIG. 13 will be described with reference to the flowchart of FIG. 14.

In S1401, the CPU 101 acquires the present position processed by the position encoding processor 602. In S1402, the CPU 101 adds 1 to the processing count. After that, the process proceeds to S1403. In S1403, it is determined whether or not the processing count is 2 or more. When it is determined that the processing count is 2 or more, the CPU 101 proceeds to S1404. When the processing count is smaller than 2, the CPU 101 proceeds to S1409 because it is not possible to measure the moving amount of the object to be controlled.

In S1404, the CPU 101 acquires the previously output total control amount, the present attitudinal change correction amount, and the previously stored position (previous position) stored in the RAM 103. The previously output total control amount is the total control amount indicated by the data stored in the RAM 103 in S1310 of FIG. 13. The previous position is the position indicated by the data stored in the RAM 103 in S1409 to be described later. In S1405, the CPU 101 estimates a velocity from the difference (that is, a moving amount) between the present position and the previous position. This process corresponds to the conversion in block 1201 of FIG. 12. An actual thrust that is estimated to actually occur is calculated based on the estimated velocity and the inverse model of the linear motor 106. This process corresponds to the conversion in block 1202 of FIG. 12. Subsequently, in S1406, the adder 1102 subtracts the attitudinal change correction amount (the value stored in the storage unit 607) from the total control amount output by the adder 606. A thrust (hereinafter referred to as an expected thrust) that is expected to occur when the control amount is applied is estimated from the control amount which is the subtraction result and the model of the linear motor 106. This process corresponds to the conversion in block 1203 of FIG. 12.

In S1407, the CPU 101 estimates a disturbance that is lost inside the linear motor 106 from the difference between the estimated value of the expected thrust calculated in S1406 and the estimated value of the actual thrust calculated in S1405. This process corresponds to the subtracting process of the adder 1204 of FIG. 12. Subsequently, in S1408, the CPU 101 calculates a disturbance canceling control amount for generating a thrust for cancelling the disturbance from the disturbance estimation value calculated in S1407. This corresponds to the conversion in block 1205 of FIG. 12. In S1409, the CPU 101 stores the present position acquired from the position encoding processor 602 in the RAM 103 for the next disturbance estimation observer process and the process ends. The position indicated by the stored data is used in the next process (S1404) as the previous position.

Next, a control example will be described in detail with reference to FIG. 9 and FIG. 15. FIG. 15 is a diagram illustrating examples of numerical changes during the operation. The items (A) to (G) in FIG. 15 are the same as those of FIG. 10, and the differences are as follows.

(I) Previous total control amount: Acquired from the data stored in the RAM 103 in S1301 of FIG. 13

(J) Disturbance estimation control amount: The difference between (I) Previous total control amount and (F) Attitudinal change correction amount. If (I) Previous total control amount is not acquired, "Calculation OFF" (the disturbance estimation observer 1101 is in the OFF state) is output.

(K) Disturbance canceling control amount: Calculated by the disturbance estimation observer 1101 in S1408 of FIG. 14.

(L) Present total control amount: The sum of (D) PID control amount, (G) Attitudinal-change-corrected FF control amount, and (K) Disturbance canceling control amount, calculated in S1309 of FIG. 13.

The object to be controlled is at a horizontal attitude in the period between T0 and T5 or later in graph P, and this period corresponds to the period illustrated in the rows (1) to (7) in FIG. 15. In the period between T0 and T1 in graph R in which the object to be controlled tracks the target stop value P1 illustrated in graph Q, the respective control amounts are "0" as illustrated in the row (1) of FIG. 15. The value "0" is stored in the storage unit 607 as (F) Attitudinal change correction amount. In the stopped state, since the disturbance estimation observer 1101 which uses (J) Disturbance estimation control amount is in the Calculation OFF state, (K) Disturbance canceling control amount is "0". That is, when the object to be controlled is controlled to be positioned at a fixed position, the disturbance canceling control amount is not added (or "0" is added).

The value "0+0+0" (that is, "0") is calculated as (L) Present total control amount based on (D) PID control amount "0", (G) Attitudinal-change-corrected FF control amount "0", and (K) Disturbance canceling control amount "0".

The respective items at time T1 at which the object to be controlled starts moving at the velocity V1 in graph R from the target stop value P1 to the value P2 illustrated in graph Q are illustrated in the row (2) of FIG. 15. It is assumed that a control amount "15" necessary for generating acceleration is calculated as (E) FF control amount. At this time, since (F) Attitudinal change correction amount is "0", the control amount "15+0=15" necessary for changing the velocity from 0 to V1 is calculated as (G) Attitudinal-change-corrected FF control amount. In the stopped state, since the disturbance estimation observer 1101 which uses (J) Disturbance estimation control amount is in the Calculation OFF state, (K) Disturbance canceling control amount is "0". The value "0+15+0" (that is, "15") is output to the control signal output unit 104 as (L) Present total control amount based on (D) PID control amount "0", (G) Attitudinal-change-corrected FF control amount "15", and (K) Disturbance canceling control amount "0".

The respective items in a period (that is, the period between T1 and T2) in which the object to be controlled moves at the velocity V1 in graph R from the target stop value P1 to the value P2 illustrated in graph Q are illustrated in the row (3) of FIG. 15. (D) PID control amount is "10", (E) FF control amount is "0", and (G) Attitudinal-change-corrected FF control amount is "0" regardless of (F) Attitudinal change correction amount. If (I) Previous total control amount stored in S1310 one cycle before is "10", since (F) Attitudinal change correction amount is "0", (J) Disturbance estimation control amount is "10−0=10". For example, (K) Disturbance canceling control amount "1" is output. The value "10+0+1" (that is, "11") is output to the control signal output unit 104 as (L) Present total control amount based on (D) PID control amount "10", (G) Attitudinal-change-corrected FF control amount "0", and (K) Disturbance canceling control amount "1".

The respective items in a period between T2 and T3 in graph R, in which the object to be controlled tracks the target stop value P2 illustrated in graph Q, are illustrated in the row (4) of FIG. 15. Similarly to the case of (1), the respective control amounts are "0" and (F) Attitudinal change correction amount "0" is stored in the storage unit 607. In the stopped state, since the disturbance estimation observer 1101 which uses (J) Disturbance estimation control amount is in the Calculation OFF state, (K) Disturbance canceling control amount is "0". The value "0+0+0" (that is, "0") is output as (L) Present total control amount based on (D) PID control amount "0", (G) Attitudinal-change-corrected FF control amount "0", and (K) Disturbance canceling control amount "0".

The respective items at time T3 when the object to be controlled starts moving at the velocity "−V1" in graph R from the target stop value P2 to the value P1 illustrated in graph Q are illustrated in the row (5) of FIG. 15. If (E) FF control amount is calculated as "−15", since (F) Attitudinal change correction amount at this time is "0", (G) Attitudinal-change-corrected FF control amount is "−15+0=−15". In the stopped state, since the disturbance estimation observer 1101 which uses (J) Disturbance estimation control amount is in the Calculation OFF state, (K) Disturbance canceling control amount is "0". The value "0−15+0" (that is, "−15") is output to the control signal output unit 104 as (L) Present total control amount based on (D) PID control amount "0", (G) Attitudinal-change-corrected FF control amount "−15", and (K) Disturbance canceling control amount "0".

The respective items in a period between T3 and T4 in which the object to be controlled moves at the velocity "−V1" in graph R from the target stop value P2 to the value P1 illustrated in graph Q are illustrated in the row (6) of FIG. 15. It is assumed that (D) PID control amount is the control amount "−10" for tracking the target position. Since (E) FF control amount is "0", (G) Attitudinal-change-corrected FF control amount is "0" regardless of (F) Attitudinal change correction amount. If (I) Previous total control amount stored in S1310 one cycle before is "−10", since (F) Attitudinal change correction amount is "0", (J) Disturbance estimation control amount is "−10−0=10". For example, (K) Disturbance canceling control amount "−1" is output. The value "−10+0−1" (that is, "−11") is output to the control signal output unit 104 as (L) Present total control amount based on (D) PID control amount "−10", (G) Attitudinal-change-corrected FF control amount "0", and (K) Disturbance canceling control amount "−1".

The respective items in the period between T4 and T5 in graph R in which the object to be controlled tracks the target stop value P1 illustrated in graph Q are illustrated in the row (7) of FIG. 15. The respective items have the same values as those of the row (1).

Hereinafter, a control amount calculation process is executed in the same manner. In the period between T6 or earlier and T11 or later in graph P, the attitude of the object to be controlled is in the Tilt 1 state, and this period corresponds to the periods illustrated in the rows (8) to (14) in FIG. 15. The rows in which the disturbance estimation observer 1101 which uses (J) Disturbance estimation control amount is in the Calculation OFF state are the same as those rows of FIG. 10. That is, (L) Present total control amount corresponds to (H) Total control amount in FIG. 10. Thus, in the following description, the rows (10) and (13) in which the disturbance estimation observer 1101 is not in the Calculation OFF state will be described.

The row (1) in FIG. 15 illustrates the respective items in the period between T7 and T8 in which the object to be controlled moves at the velocity V1 in graph R from the target stop value P1 to the value P2 in graph Q. It is assumed that (D) PID control amount is the control amount "0" for tracking the target position. Since (E) FF control amount is the control amount "0" that does not generate acceleration in a constant velocity zone, (G) Attitudinal-change-corrected FF control amount is "0" regardless of (F) Attitudinal change correction amount. If (I) Previous total control amount stored in S1310 one cycle before is "0", since (F) Attitudinal change correction amount is "−10", (J) Disturbance estimation control amount is "0−(−10)=10." For example, (K) Disturbance canceling control amount is "1" similarly to the row (3) of FIG. 15 in which the attitude is at the horizontal attitude. The value "0+0+1" (that is, "1") is output to the control signal output unit 104 as (L) Present total control amount based on (D) PID control amount "0", (G) Attitudinal-change-corrected FF control amount "0", and (K) Disturbance canceling control amount "1".

The row (13) of FIG. 15 illustrates the respective items in the period between T9 to T10 in which the object to be controlled moves at the velocity "−V2" in graph R from the target stop value P2 to the value P0 illustrated in graph Q. It is assumed that (D) PID control amount is the control amount "−30" for tracking the target position. Since (E) FF control amount is the control amount "0" that does not generate acceleration in a constant velocity zone, (G) Attitudinal-change-corrected FF control amount is "0" regardless of (F) Attitudinal change correction amount. If (I) Previous total control amount stored in S1310 one cycle before is "−30", since (F) Attitudinal change correction amount is "−10", (J) Disturbance estimation control amount is "−30−(−10)=−20". For example, (K) Disturbance canceling control amount "−1" is output. The value "−30+0−1" (that is, "−31") is output to the control signal output unit 104 as (L) Present total control amount based on (D) PID control amount "−30", (G) Attitudinal-change-corrected FF control amount "0", and (K) Disturbance canceling control amount "−1".

The attitude of the object to be controlled is in the Tilt 2 state in the period between T12 or earlier and T16 or later in graph P, and this period corresponds to the periods illustrated in the rows (15) to (20) in FIG. 15. The rows in which the disturbance estimation observer 1101 which uses (J) Disturbance estimation control amount is in the Calculation OFF state are the same as those rows of FIG. 10. That is, (L) Present total control amount corresponds to (H) Total control amount in FIG. 10. Thus, in the following description, the rows (16) and (19) in which the disturbance estimation observer 1101 is not in the Calculation OFF state will be described.

The row (16) in FIG. 15 illustrates the respective items in the period between T12 and T13 in which the object to be controlled moves at the velocity V1 in graph R from the target stop value P3 to the value P4 in graph Q. It is assumed that (D) PID control amount is the control amount "15" for tracking the target position. Since (E) FF control amount is the control amount "0" that does not generate acceleration in a constant velocity zone, (G) Attitudinal-change-corrected FF control amount is "0" regardless of (F) Attitudinal change correction amount. If (I) Previous total control amount stored in S1310 one cycle before is "−15", since (F) Attitudinal change correction amount is "5", (J) Disturbance estimation control amount is "15−5=10". For example, (K) Disturbance canceling control amount is "1" similarly to the row (3) of FIG. 15 in which the attitude is at the horizontal attitude. The value "15+0+1" (that is, "16") is output to the control signal output unit 104 as (L) Present total control amount based on (D) PID control amount "15", (G) Attitudinal-change-corrected FF control amount "0", and (K) Disturbance canceling control amount "1".

The row (19) of FIG. 15 illustrates the respective items in the period between T14 to T15 in which the object to be controlled moves at the velocity "−V1" in graph R from the target stop value P4 to the value P3 illustrated in graph Q. It is assumed that (D) PID control amount is the control amount "−5" for tracking the target position. Since (E) FF control amount is the control amount "0" that does not generate acceleration in a constant velocity zone, (G) Attitudinal-change-corrected FF control amount is "0" regardless of (F) Attitudinal change correction amount. If (I) Previous total control amount stored in S1310 one cycle before is "−5," since (F) Attitudinal change correction amount is "5", (J) Disturbance estimation control amount is "−5−5=−10". For example, (K) Disturbance canceling control amount is "−1" similarly to the row (6) of FIG. 15 in which the attitude is at the horizontal attitude. The value "−5+0−1" (that is, "−6") is output to the control signal output unit 104 as (L) Present total control amount based on (D) PID control amount "−5", (G) Attitudinal-change-corrected FF control amount "0", and (K) Disturbance canceling control amount "−1".

Next, a camera lens position control device will be described as an application example of the position control device. An attitudinal change of a camera occurs during tilting or close-up photographing, for example. The camera attitude changes at a low cycle of several seconds during photographing whereas driving and stopping are repeated at a high cycle of several milliseconds during position control. An attitudinal change occurring when the lens which is a movable optical member is moving while tracking a target movement value (that is, during disturbance estimation) becomes the cause of an estimation error. Such an estimation error can be suppressed in the present embodiment. As described above, this results from the effect of the process of adding low-frequency components of the attitudinal change correction amount in the stopping period to the feedforward control amount. Thus, in the present embodiment, the estimation error is smaller than that when an attitudinal change of the camera is not taken into consideration. Although an attitudinal change during the feedforward control becomes the cause of a velocity difference between the forward moving velocity and the backward moving velocity, the velocity difference can be suppressed in the present embodiment. As described above, this results from the effect of the process of adding low-frequency components of the attitudinal change correction amount in the stopping period to the feedforward control amount. Thus, in the present embodiment, the estimation error is smaller than that when an attitudinal change of the camera is not taken into consideration.

In the present embodiment, a control amount output to resist an attitudinal change of the object to be controlled during the position control of controlling the position to be at a fixed position is stored in the storage unit, and the control amount stored in the storage unit is subtracted from the total control amount to perform disturbance estimation during the position control of controlling the position to be at a fixed position. Thus, since a control amount that does not contribute to a velocity change for resisting the attitudinal change of the object to be controlled is removed, it is possible to suppress an estimation error resulting from the attitudinal change. Moreover, during feedforward control of causing the object to be controlled to track the target velocity, a feedforward output is corrected based on the attitudinal change correction amount. Since the output is corrected based on the control amount for balancing against the attitudinal change of the object to be controlled, the possibility of a velocity difference occurring due to a difference in the moving direction can be suppressed by the feedforward output even when the attitude of the object to be controlled changes. Therefore, it is possible to stabilize position servo control.

Third Embodiment

Next, a third embodiment of the present invention will be described. In the present embodiment, the output of a PID compensator when the target velocity is 0 and the position is being controlled to be at a fixed position is stored as an attitudinal change correction amount. In adaptive identification, the stored attitudinal change correction amount is subtracted from a control input to perform identification. The same constituent elements as those of the first and second embodiments will be denoted by the same reference numerals. Moreover, the detailed description thereof will not be provided, and differences will be mainly described.

Figure 16:
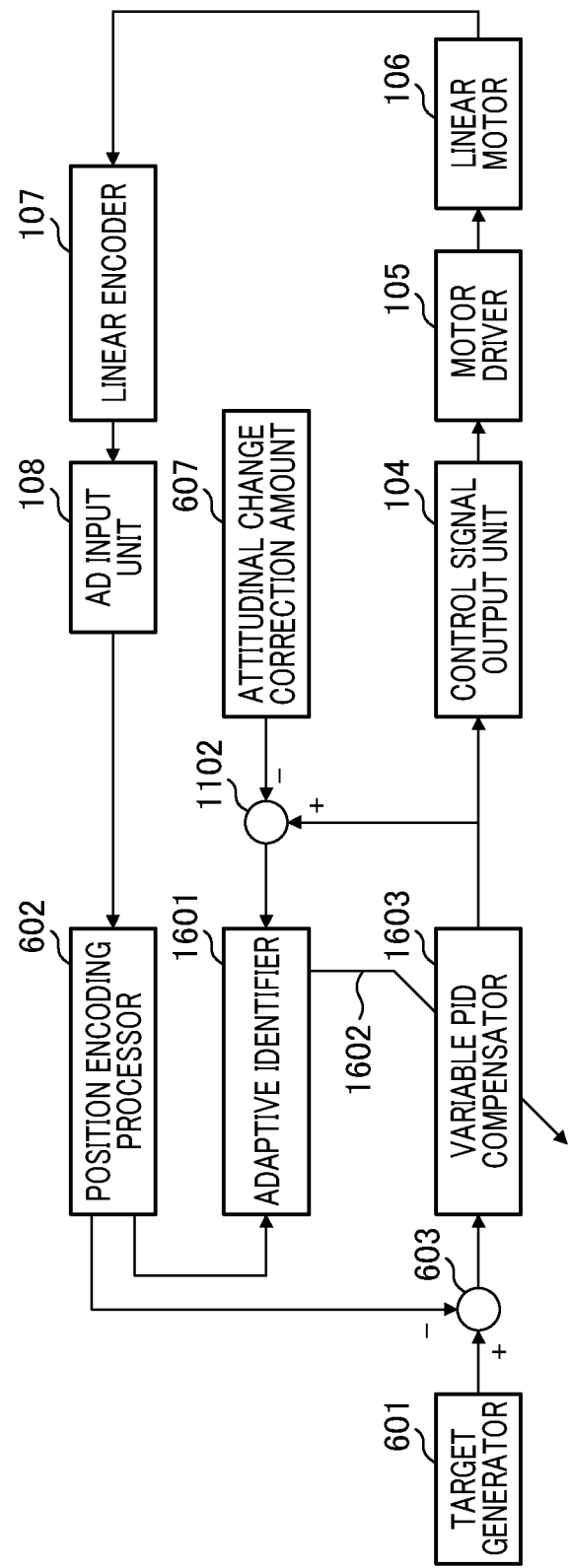
FIG. 16 is a block diagram according to a third embodiment of the present invention.

FIG. 16 illustrates a block diagram of a control system according to the present embodiment. It is assumed that an adder performs an addition process and a subtraction process (addition of negative values). The distance signal obtained by the position encoding processor 602 is output to the adder 603 and an adaptive identifier (adaptive identification unit) 1601. The storage unit 607 stores the attitudinal change correction amount. The attitudinal change correction amount is a control amount used for subtracting a control amount for resisting an attitudinal change from a PID control amount when the adaptive identifier 1601 performs adaptive identification and for maintaining a stopped state when a object to be controlled is in the stopped state. A method of determining the attitudinal change correction amount stored in the storage unit 607 will be described later.

The adder 1102 receives a PID control amount (feedback control amount) output by a variable PID compensator (feedback compensator) 1603 as a positive input and the attitudinal change correction amount stored in the storage unit 607 as a negative input and subtracts the attitudinal change correction amount from the control amount. The subtraction result (input for identification) is output to the adaptive identifier 1601. The subtraction result is a control amount made up of components that contribute to a velocity change.

The adaptive identifier 1601 receives the output of the adder 1102 and the output of the position encoding processor 602. The adaptive identifier 1601 performs adaptive identification based on an identification error which is a difference between an actual response of a object to be controlled and an output of an identification model adaptively identified from the actual response and a control amount applied to the linear motor 106. That is, adaptive identification is performed so that the output of the identification model matches the actual response. An estimation parameter identified by the adaptive identifier 1601 is output to the variable PID compensator 1603 as a signal 1602. The details of the adaptive identifier 1601 will be described later with reference to FIG. 17.

The variable PID compensator 1603 corrects a PID control coefficient based on the estimation parameter output by the adaptive identifier 1601 and uses the PID control coefficient in generation of a subsequent PID control amount. The PID control amount is output to the control signal output unit 104 and the adder 1102. In this way, a servo control system that causes the position of the linear motor 106 to track the target value is formed.

Figure 17:
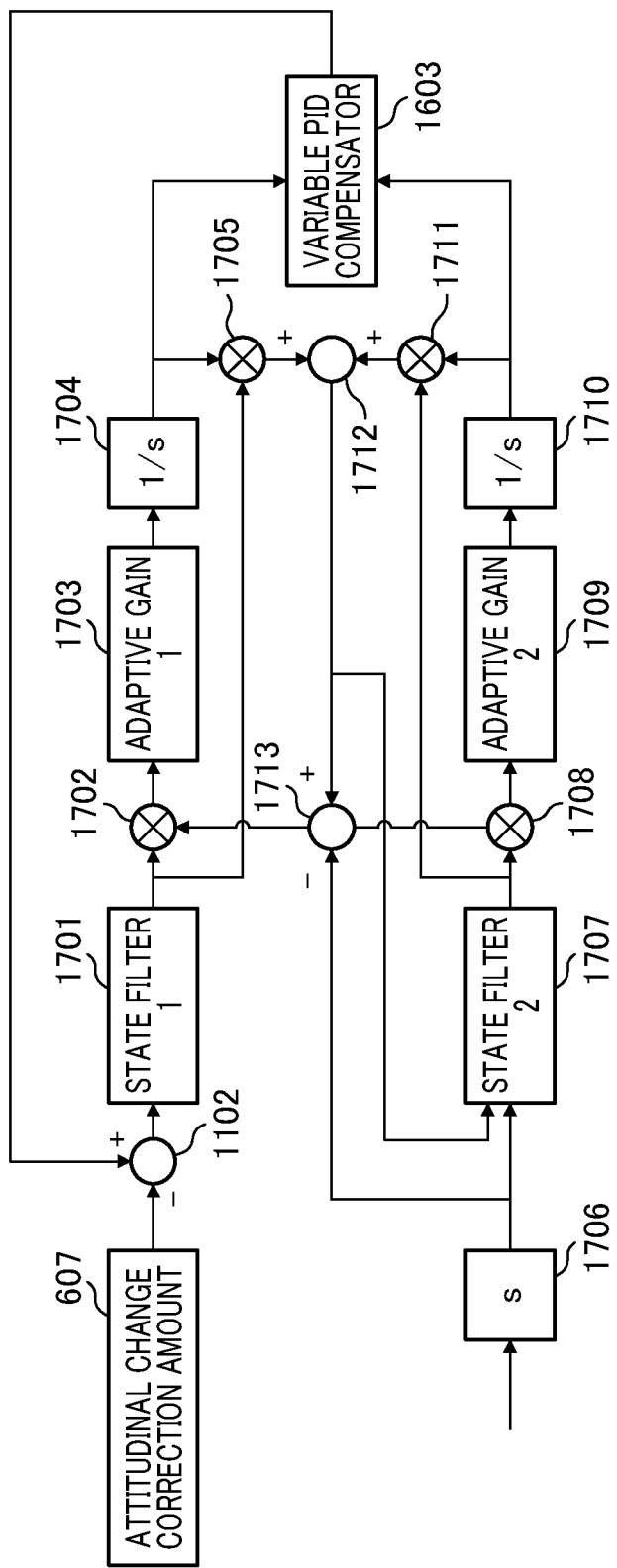
FIG. 17 is a block diagram of an adaptive identifier according to the third embodiment.

Next, the configuration of the adaptive identifier 1601 will be described in detail with reference to the block diagram of FIG. 17. In the drawing, "s" indicates the Laplace variable. It is assumed that a multiplier performs a multiplication process and a division process. State filter 1 (1701) performs filtering on the control amount obtained by subtracting the attitudinal change correction amount from the control amount of the variable PID compensator 1603, output by the adder 1102, to output state filter output value 1. For example, it is assumed that a transfer function is $1/(s+\lambda)$, s is the Laplace variable, and $\lambda > 1$.

Based on adaptive identification rule 1, after the output value 1 of state filter 1 (1701) and the identification error output by an adder 1713 are multiplied by a multiplier 1702, the multiplication result is converted by adaptive gain 1 (1703), and the conversion result is integrated by block 1704 to obtain estimation parameter value 1. For example, adaptive identification rule 1 involves integrating the product of the state filter output value 1, the identification error, and the negative adaptive gain 1. Although various adaptive identification rules have been proposed, the present invention is not limited to the adaptive identification rule according to the present embodiment as long as the adaptive identification rule allows an identification error to approach zero with time. A multiplier 1705 multiplies the state filter output value 1 and the estimation parameter value 1 output by block 1704 and outputs the multiplication result.

Block 1706 differentiates the position information output by the position encoding processor 602 to convert the position information to velocity information. In the drawing, "s" indicates the Laplace variable. State filter 2 (1707) performs filtering on the velocity information output by block 1706 or the output of the identification model, output by the adder 1712 to output state filter output value 2. For example, the same transfer function as in state filter 1 (1701) is used. The output of block 1706 is processed when the estimation parameter value is completely unknown, and the output of the adder 1712 is processed when the estimation parameter value is known.

Based on adaptive identification rule 2, after the state filter output value 2 and the identification error output by the adder 1713 are multiplied by a multiplier 1708, the multiplication result is converted by adaptive gain 2 (1709), and the conversion result is integrated by block 1710 to obtain estimation parameter value 2. Adaptive identification rule 2 is the same as adaptive identification rule 1 except for the filter output value input thereto. A multiplier 1711 multiplies the state filter output value 2 and the estimation parameter value 2 which is the output of the block 1710 and outputs the multiplication result. An adder 1712 adds the output of the multiplier 1705 and the output of the multiplier 1711 and outputs the addition result as a response of the identification model. An adder 1713 outputs a difference between a response output (a response of identification model) of the identification model output from the adder 1712 and an actual response (a response of the object to be identified) output by block 1706 to the multipliers 1702 and 1708 as an identification error.

The fact that the identification error which is a difference between the actual response and the response output of the identification model decreases means that the identification model approaches the response of an actual apparatus. The present embodiment uses such an adaptive identification rule that the result of an integration of the product of the state filter output value, the identification error, and the negative adaptive gain is used as the estimation parameter value, for example. Thus, when the identification error comes closer to zero, the value integrated to the estimation parameter value is smaller and a convergent state is closer to being reached.

The estimation parameter values 1 and 2 which are the identification results are referred to from the variable PID compensator 1603 and are used for correction of a control parameter such as a gain coefficient. For example, when a new gain is determined in order to cancel a change from the ratio of an estimation parameter value when a gain for generating a present PID control amount is determined to a newly identified estimation parameter value, it is possible to suppress variations in control loop characteristics.

Figure 18:
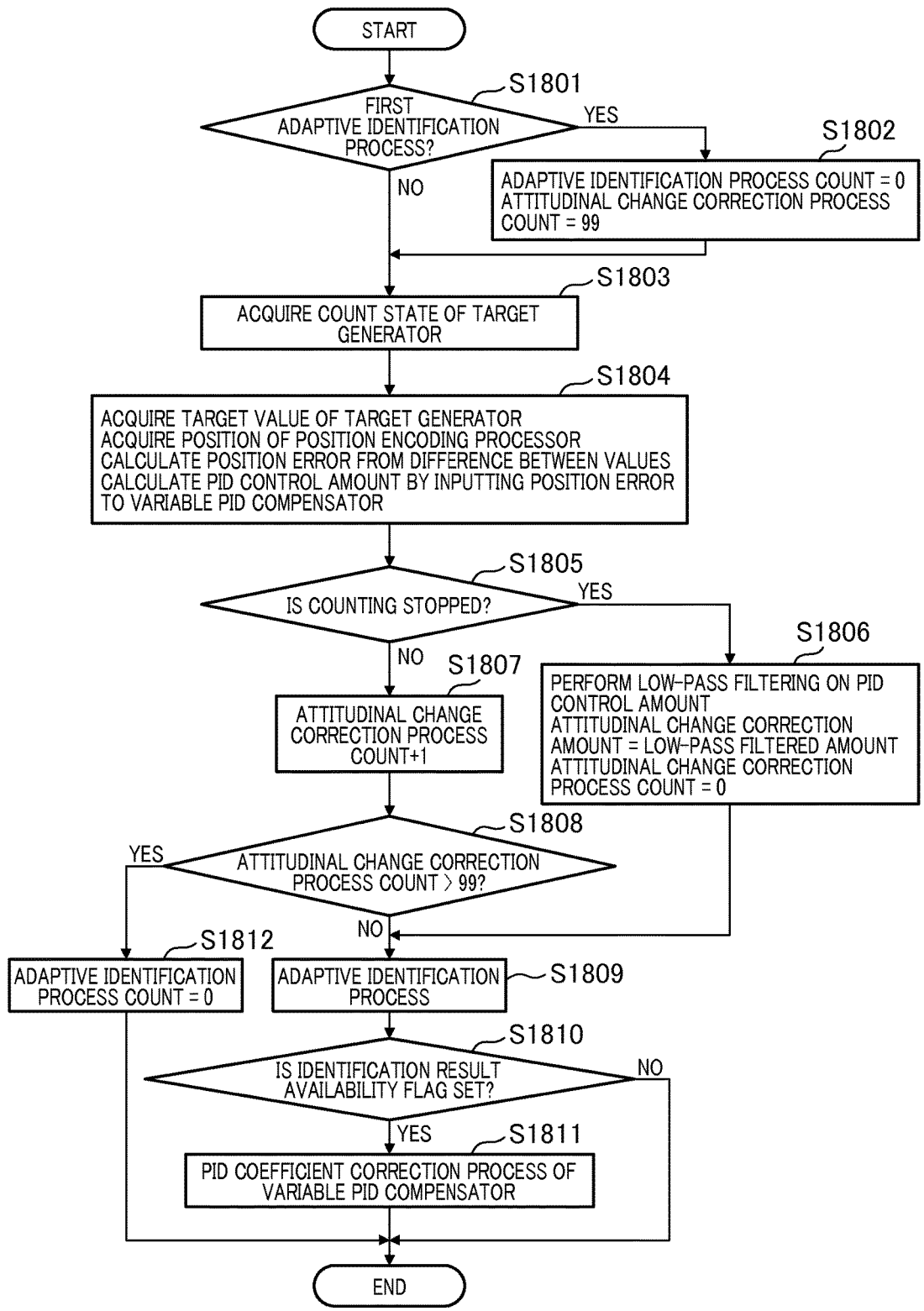
FIG. 18 is a flowchart illustrating the processes of the third embodiment.
Figure 19:
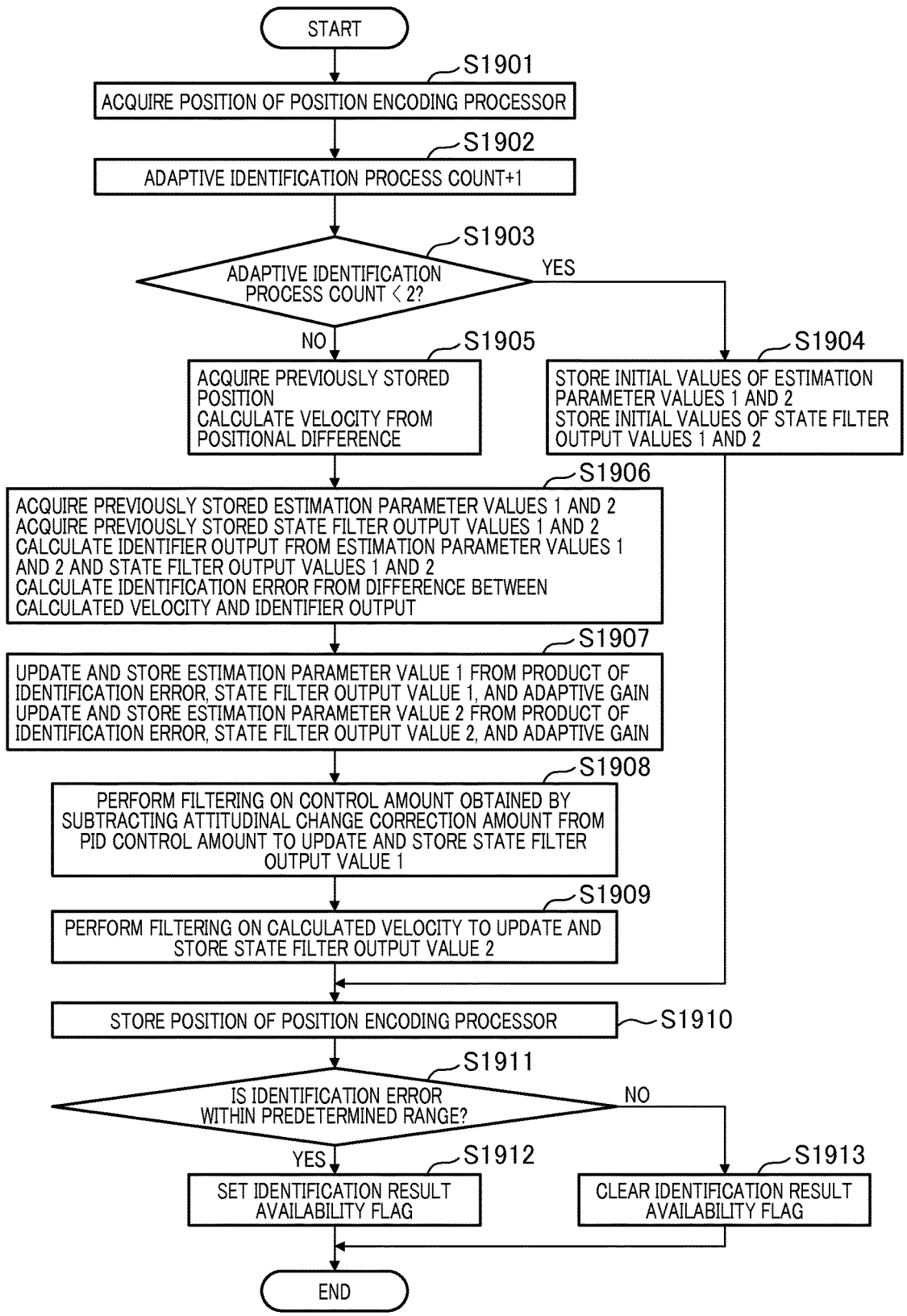
FIG. 19 is a flowchart illustrating an adaptive identification process according to the third embodiment.

Next, a process of determining an attitudinal change correction amount for an adaptive identifier capable of reducing the possibility of an adaptive identification error even when an attitude of an object to be controlled changes will be described with reference to FIGS. 16 to 20. FIG. 18 is a flowchart illustrating the position control process that the CPU 101 executes in the block diagram of FIG. 16. FIG. 19 is a flowchart illustrating an adaptive identification process illustrated in S1809 of FIG. 18 in detail.

In S1801 of FIG. 18, the CPU 101 determines whether or not the present adaptive identification process is the first adaptive identification process. The process proceeds to S1802 when the present process is the first process and proceeds to S1803 when the present process is the second process or a subsequent process. In S1802, the CPU 101 sets an adaptive identification process count to 0 and an attitudinal change correction process count to 99 and the process proceeds to S1803. In S1803, the CPU 101 acquires a count state indicating whether the target generator 601 is incrementing or decrementing the count of a target value or stops counting. The count being incremented or decremented means that the target velocity is not 0 and it is instructed that position control of causing the object to be controlled to track a target movement be performed. Moreover, the stopped counting means that the target velocity is 0 and it is instructed that position control of causing the object to be controlled to be continuously stopped at a fixed position be performed. In S1804, the CPU 101 acquires the target value output by the target generator 601 and the present position processed by the position encoding processor 602 and calculates a position error from the difference between the target value and the present position with the aid of the adder 603. The variable PID compensator 1603 receives the position error and calculates a PID control amount based on the position error.

In S1805, the CPU 101 determines whether or not the target generator 601 stops counting. When the counting is stopped, the process proceeds to S1806. When the count is being incremented or decremented, the process proceeds to S1807. In S1806, the CPU 101 performs a low-pass filter process of extracting an attitudinal change correction amount that changes at a predetermined frequency or lower from the present PID control amount calculated in S1804. The cutoff frequency is set similarly to the first and second embodiments. The value obtained after the filtering is performed is stored in the storage unit 607 as the attitudinal change correction amount. The attitudinal change correction process count is cleared to zero, and the process proceeds to S1809.

In S1807, the CPU 101 increments the attitudinal change correction process count by 1 and the process proceeds to S1808. In S1808, the CPU 101 determines whether or not the attitudinal change correction process count is equal to or larger than 99. The process proceeds to S1812 when the count is equal to or larger than 99 and proceeds to S1809 when the count is smaller than 99. Due to this, since the initial value of the attitudinal change correction process count is set to 99, the adaptive identification process is not performed until a state in which position control of causing the object to be controlled to be continuously stopped at a fixed position is performed occurs at least once. Moreover, the adaptive identification process is not performed by taking a shift with time of the attitudinal change correction amount into consideration when a state in which position control of causing the object to be controlled to be continuously stopped at a fixed position is not performed occurs 100 times or more. That is, the adaptive identification process is not performed when the attitudinal change correction amount is not stored in the storage unit 607 or when the stored attitudinal change correction amount is not updated for a predetermined period or longer.

In S1809, the CPU 101 executes the adaptive identification process with the aid of the adaptive identifier 1601. The details of the adaptive identification process will be described later with reference to FIG. 19. In S1810, the CPU 101 determines whether or not an identification result availability flag is set. The process proceeds to S1811 when the flag is set and ends when the flag is not set. In S1811, the CPU 101 executes a process of correcting the PID coefficient of the variable PID compensator 1603 using the adaptive identification result of the adaptive identifier 1601. The details of the PID coefficient correction process will be described later with reference to FIG. 20. In S1812, the CPU 101 sets the adaptive identification process count to 0 and the process ends.

Next, the adaptive identification process illustrated in S1809 of FIG. 18 will be described with reference to the flowchart of FIG. 19. In S1901, the CPU 101 acquires the present position processed by the position encoding processor 602. In S1902, the CPU 101 adds 1 to the adaptive identification process count. After that, the process proceeds to S1903. In S1903, it is determined whether or not the process count is smaller than 2. When it is determined that the process count is 2 or more, the CPU 101 proceeds to S1905. When the process count is smaller than 2, the CPU 101 proceeds to S1904 because it is not possible to measure the moving amount of the object to be controlled. In S1904, the CPU 101 stores the initial values of the estimation parameter values 1 and 2 stored in the ROM 102 in the RAM 103 as the initial values of blocks 1704 and 1710. Moreover, the CPU 101 stores the initial values of the state filter output values 1 and 2 in the RAM 103 as the initial values of blocks 1701 and 1707 and proceeds to S1910.

In S1905, the CPU 101 acquires the previously stored position (previous position) stored in the RAM 103. The previous position is the position indicated by the data stored in the RAM 103 in S1910 to be described later. The CPU 101 estimates a velocity from the difference (that is, a moving amount) between the present position and the previous position. This process corresponds to the conversion in block 1706 of FIG. 17.

In S1906, the CPU 101 acquires the estimation parameter values 1 and 2 and the state filter output values 1 and 2 stored previously in the RAM 103. The CPU 101 adds the product of the estimation parameter value 1 and the state filter output value 1 and the product of the estimation parameter value 2 and the state filter output value 2 to calculate the identifier output. This process corresponds to the multiplication process of the multipliers 1705 and 1711 and the addition process of the adder 1712. Further, the CPU 101 calculates the difference between the velocity calculated in S1905 and the identifier output as an identification error and proceeds to S1907. This process corresponds to the subtraction process of the adder 1713 illustrated in FIG. 17.

In S1907, the CPU 101 updates and stores the estimation parameter value 1 obtained by integrating the product of the identification error, the state filter output value 1, and the adaptive gain. This process corresponds to the multiplication process of the multiplier 1702 of FIG. 17 and the conversion in blocks 1703 and 1704. Moreover, the CPU 101 updates and stores the estimation parameter value 2 obtained by integrating the product of the identification error, the state filter output value 2, and the adaptive gain and then proceeds to S1908. This process corresponds to the multiplication process of the multiplier 1708 of FIG. 17 and the conversion in blocks 1709 and 1710.

In S1908, the CPU 101 performs filtering on the control amount obtained by subtracting the attitudinal change correction amount stored in S1806 from the PID control amount calculated in S1804 to update and store the state filter output value 1 and then proceeds to S1909. This process corresponds to the subtraction process of the adder 1102 of FIG. 17 and the conversion in block 1701. Since the attitudinal change correction amount is subtracted from the present control amount, even when an attitudinal change occurs, a control amount which is normalized to a horizontal attitude is obtained. In S1909, the CPU 101 performs filtering on the velocity calculated in S1905 to update and store the state filter output value 2 and then proceeds to S1910. This process corresponds to the conversion in block 1707 of FIG. 17.

In S1910, the CPU 101 stores the present position acquired from the position encoding processor 602 in the RAM 103 as the position for the next adaptive identification process, and then the process ends. The position indicated by the stored data is used in the next process (S1905) as the previous position. In S1911, it is determined whether or not the identification error is within a predetermined range. When it is determined that the identification error is within the predetermined range, the CPU 101 proceeds to S1912. When it is determined that the identification error is outside the predetermined range, the CPU 101 determines that the identification result does not converge and proceeds to S1913. In S1912, the CPU 101 sets the identification result availability flag and ends the process because the identification result converges. In S1913, the CPU 101 clears the identification result availability flag and ends the process because the identification result does not converge.

Figure 20:
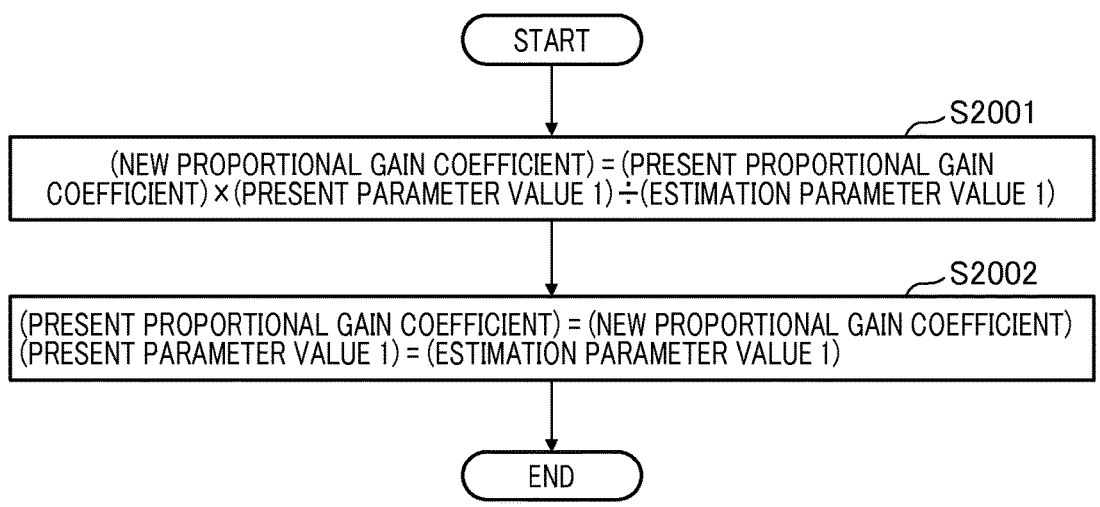
FIG. 20 is a flowchart illustrating a PID coefficient correction process according to the third embodiment.

Next, the PID coefficient correction process of the variable PID compensator illustrated in S1811 of FIG. 18 will be described with reference to the flowchart of FIG. 20. In S2001, the CPU 101 multiplies a present proportional gain coefficient and the ratio of a present parameter value 1 which is the base of the present proportional gain coefficient to new estimation parameter value 1 to calculate a new proportional gain coefficient and proceeds to S2002. In S2002, the CPU 101 stores the new proportional gain coefficient calculated in S2001 as the present proportional gain coefficient, stores the new estimation parameter value 1 used in S2001 as the present parameter value 1 which is the base of the present proportional gain coefficient, and ends the process.

Although an attitudinal change of a object to be controlled during adaptive identification becomes the cause of an identification error, the identification error can be suppressed in the present embodiment. As described above, this results from the effect of the process of subtracting low-frequency components of the attitudinal change correction amount in the stopping period from the control amount input to the adaptive identification process. That is, in the present embodiment, the identification error is smaller than that when the attitudinal change is not taken into consideration because the process is equivalent to identifying from a control amount that is always normalized to a horizontal attitude.

Moreover, in the present embodiment, the control amount output to resist an attitudinal change of the object to be controlled during position control of controlling the object to be controlled to be positioned at a fixed position is stored in the storage unit, and the control amount stored in the storage unit is subtracted from the present control amount and used for identification. Thus, since a control amount that does not contribute to a velocity change for resisting the attitudinal change of the object to be controlled is removed, it is possible to suppress an identification error resulting from the attitudinal change. Therefore, it is possible to stabilize position servo control when the adaptive identification result is used as a condition for determining the control parameter of the position servo control.

Fourth Embodiment

Next, a fourth embodiment of the present invention will be described. In the present embodiment, the output of a feedback compensator when the model velocity of a standard model is 0 and the position is being controlled to be at a fixed position is stored as an attitudinal change correction amount. In adaptive identification, the stored attitudinal change correction amount is subtracted from a control input to perform identification. The same constituent elements as those of the first, second, and third embodiments will be denoted by the same reference numerals. Moreover, the detailed description thereof will not be provided, and differences will be mainly described.

FIG. 21 illustrates a block diagram of a control system according to the present embodiment. It is assumed that an adder performs an addition process and a subtraction process (addition of negative values). It is also assumed that a multiplier performs a multiplication process and a division process.

The distance signal obtained by the position encoding processor 602 is output to an adder 2107 and the adaptive identifier 1601. The storage unit 607 stores the attitudinal change correction amount. The attitudinal change correction amount is used for subtracting a control amount for resisting an attitudinal change from a control amount used for identification when the adaptive identifier 1601 performs adaptive identification. A method of determining the attitudinal change correction amount stored in the storage unit 607 will be described later.

The adder 2101 receives a target value signal output by the target generator 601 as a positive input and a model position signal output by a linear encoder model 2103 and calculates and outputs the difference between the signals. This difference is a model position error. A linear motor standard velocity model 2102 receives the model position error output by the adder 2101 as an input, generates a model velocity, and outputs the model velocity to the linear encoder model 2103 and an inverse model filter 2104.

The linear encoder model 2103 receives the model velocity as an input, converts the model velocity to a model position of the same unit as the position encoding processor 602, and outputs the model position to the adders 2107 and 2101. It is assumed that, if the transfer function of the linear motor standard velocity model 2102 is 1/(s+1) (s is the Laplace variable), for example, the inverse model filter 2104 has a transfer function of (s+1). That is, the inverse model filter 2104 acquires a standard response to the target velocity of the standard model and converts the standard response to a standard control amount. The adder 2105 receives the signal output by the inverse model filter 2104 as a positive input and a multiplication result between an actual velocity and the estimation parameter value 2 output by the multiplier 2201 of the adaptive identifier 1601 of FIG. 22 as a negative input and calculates and outputs a difference between the signals.

The multiplier 2106 receives the signal output by the adder 2105 as a multiplier input and the estimation parameter 1 output by the adaptive identifier 1601 as a divisor input, multiplies the signals and outputs the result. In this way, the multiplier 2106 converts a control amount to such an adaptive control amount that the adaptively identified velocity of the object to be controlled is controlled using a standard response velocity as a velocity target and operates as a feedforward element corresponding to a second calculator (adaptive controller).

The adder 2107 receives the model position output by the linear encoder model 2103 as a positive input and a present actual position signal output by the position encoding processor 602 as a negative input and calculates and outputs a difference between the signals. This difference is a position error of the feedback compensator 604. The feedback compensator 604 receives the position error output by the adder 2107, generates a feedback control amount, and outputs the feedback control amount to the adder 2108.

The adder 2108 adds the output of the feedback compensator 604 and the output of the multiplier 2106. The addition result is output to the control signal output unit 104 and the adder 1102. In this way, a model-standard-type adaptive servo control system for causing the target value to track the standard response of the linear motor standard velocity model 2102 is formed.

Figure 22:
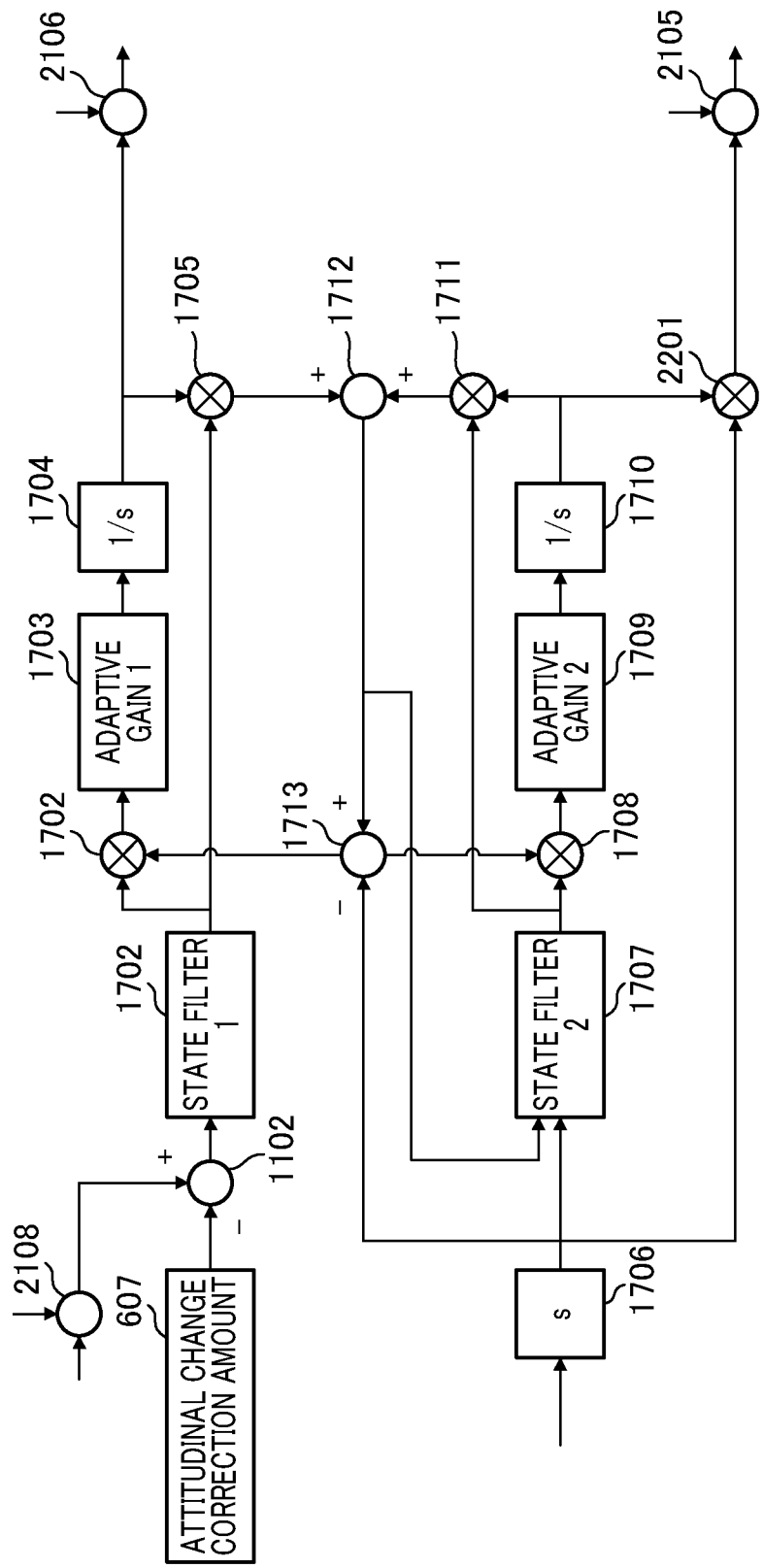
FIG. 22 is a block diagram of an adaptive identifier according to the fourth embodiment.

Next, the configuration of the adaptive identifier 1601 will be described with reference to the block diagram of FIG. 22. In the drawing, "s" indicates the Laplace variable. It is assumed that a multiplier performs a multiplication process and a division process. The description of blocks indicated by the same reference numerals as those of FIG. 17 will not be provided.

The feedback control amount output by the adder 1102 and a control amount obtained by subtracting the attitudinal change correction amount from the adaptive control amount output by the adder 2108 are input to state filter 1 (1701). A multiplier 2201 multiplies the estimation parameter value 2 integrated by block 1710 and the actual velocity output by block 1706 as an identification result and outputs the identification result to an adder 2105. The estimation parameter value 1 integrated by block 1704 is output to a multiplier 2106 as an identification result. The same adaptive identification rule as the third embodiment is used.

Figure 23:
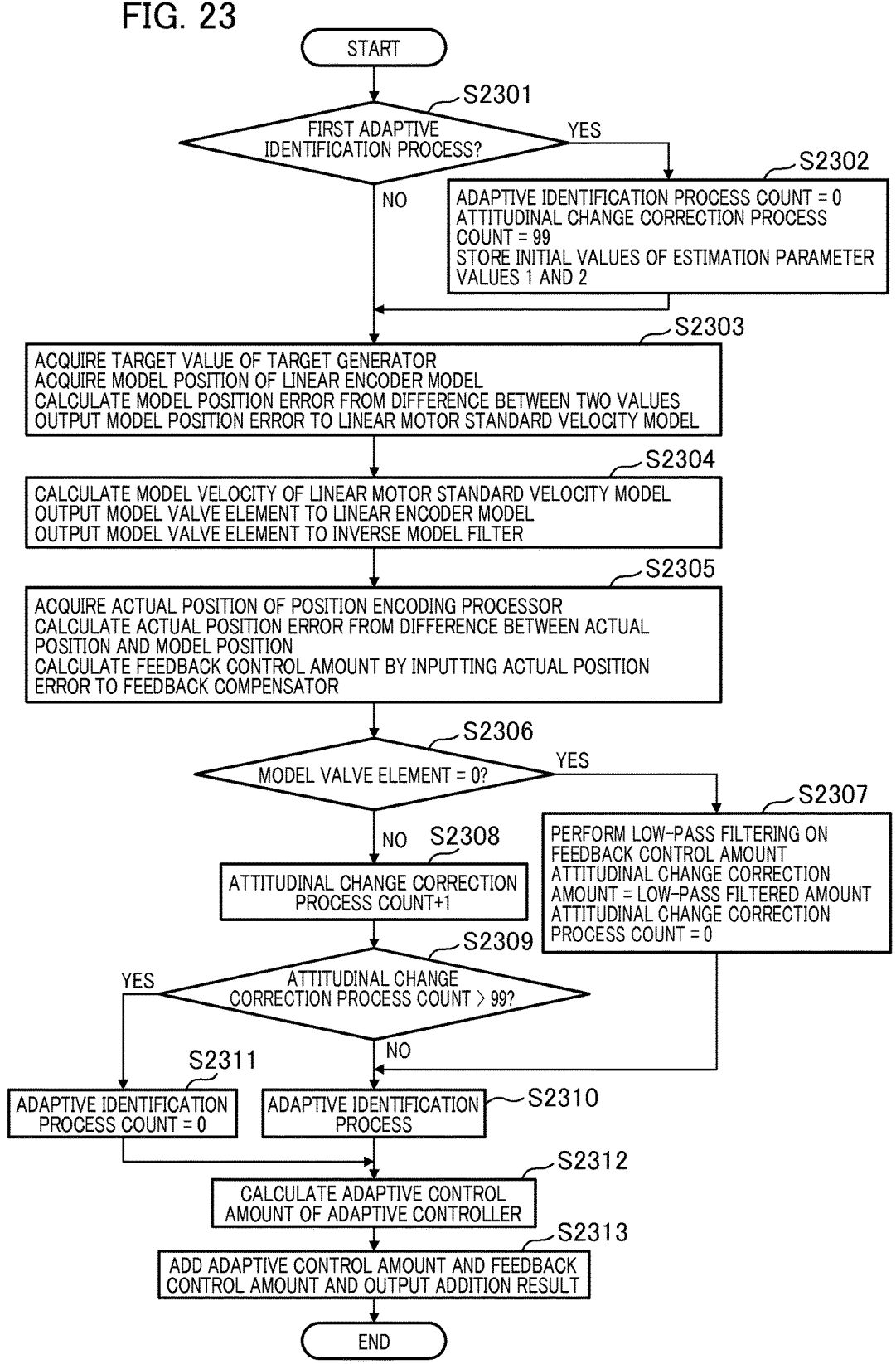
FIG. 23 is a flowchart illustrating the processes of the fourth embodiment.
Figure 24:
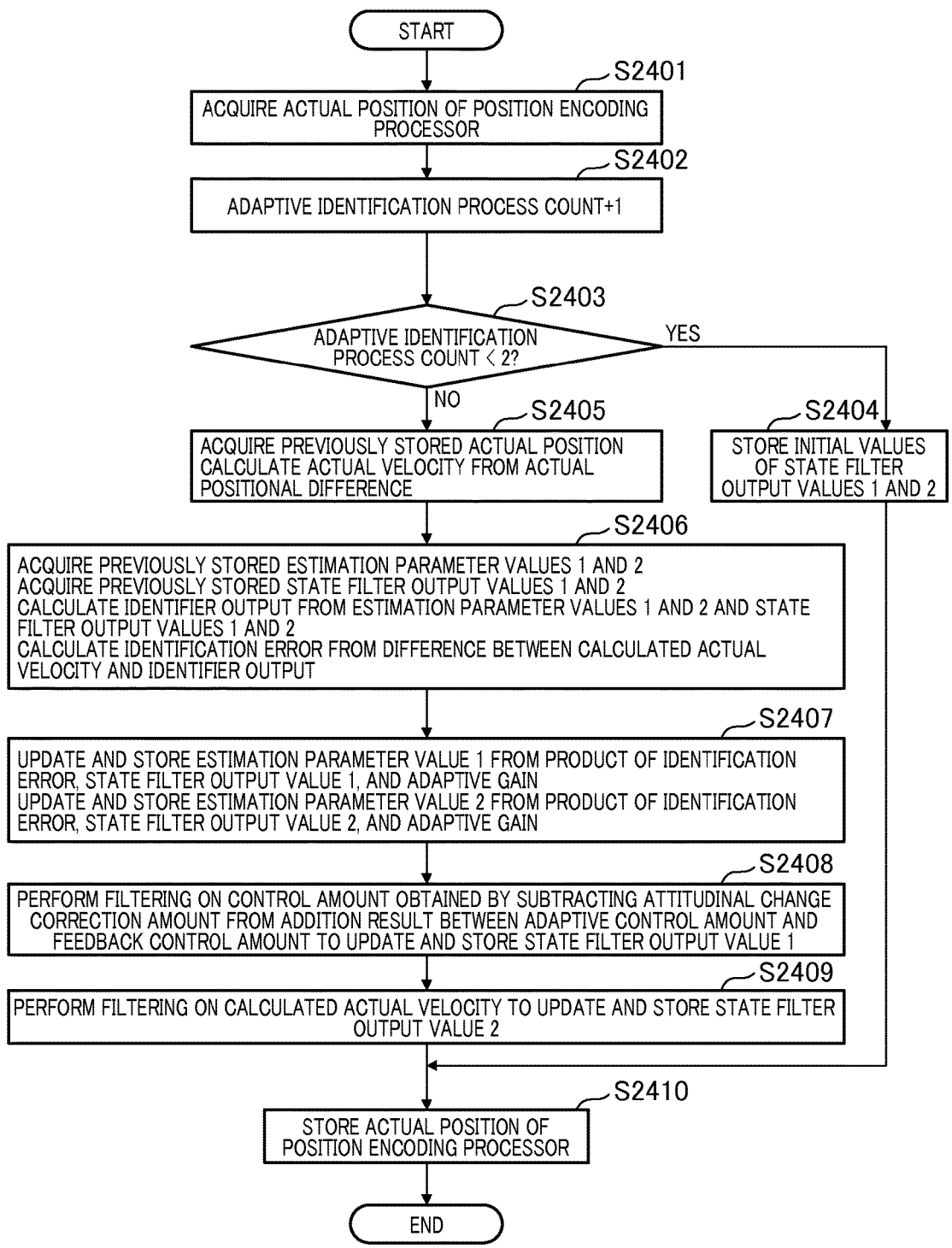
FIG. 24 is a flowchart illustrating an adaptive identification process according to the fourth embodiment.

Next, a process of determining an attitudinal change correction amount for an adaptive identifier capable of reducing the possibility of an adaptive identification error even when an attitude of an object to be controlled changes will be described with reference to FIGS. 21 to 24. FIG. 23 is a flowchart illustrating the position control process that the CPU 101 executes in the block diagram of FIG. 21. FIG. 24 is a flowchart illustrating an adaptive identification process illustrated in S2310 of FIG. 23 in detail.

In S2301 of FIG. 23, the same process as S1801 of FIG. 18 is performed. In S2302, the CPU 101 sets an adaptive identification process count to 0 and an attitudinal change correction process count to 99. Moreover, the CPU 101 stores the initial values of the estimation parameter values 1 and 2 stored in the ROM 102 in the RAM 103 as the initial values of blocks 1704 and 1710 and proceeds to S2303.

In S2303, the CPU 101 acquires the target value output by the target generator 601, acquires the model position output by the linear encoder model 2103, and calculates a model position error from the difference between the values. The CPU 101 outputs the calculated model position error to the linear motor standard velocity model 2102 and proceeds to S2304. This process corresponds to the calculation process of the adder 2101 of FIG. 21.

In S2304, the CPU 101 acquires the model velocity output by the linear motor standard velocity model 2102, outputs the model velocity to the linear encoder model 2103 and the inverse model filter 2104, and proceeds to S2305. This process corresponds to the conversion in block 2102 of FIG. 21. The linear motor standard velocity model 2102 is substituted with a filter process.

In S2305, the CPU 11 acquires the model position output by the linear encoder model 2103 and the present actual position processed by the position encoding processor 602 and calculates an actual position error from the difference between the model position and the present actual position with the aid of the adder 2107. The linear encoder model 2103 is substituted with an integration process. The feedback compensator 604 calculates a feedback control amount based on the actual position error as an input.

In S2306, the CPU 101 determines whether or not the model velocity is zero (that is, the object to be controlled is in a stopped state). The process proceeds to S2307 when the model velocity is zero and proceeds to S2308 when the model velocity is not zero. In S2307, the CPU 101 performs a low-pass filter process of extracting an attitudinal change correction amount that changes at a predetermined frequency or lower from the present feedback control amount calculated in S2305. The cutoff frequency is set similarly to the third embodiment. The value obtained after the filtering is performed is stored in the storage unit 607 as the attitudinal change correction amount. The attitudinal change correction process count is cleared to zero, and the process proceeds to S2310.

Since the linear motor standard velocity model 2102 does not model the influence of an attitudinal change of the object to be controlled, when the model position reaches a target position, the model velocity reaches zero. When the model velocity is zero, since the adaptive control amount input from the multiplier 2106 to the adder 2108 reaches zero, a control amount for resisting a decrease in the attitudinal change occurs as a feedback control amount. In S2308 and S2309, the same processes as S1807 and S1808 of FIG. 18 are performed. In S2310, the CPU 101 executes an adaptive identification process with the aid of the adaptive identifier 1601.

The details of the adaptive identification process will be described later with reference to FIG. 24. In S2311, the same process as S1812 of FIG. 18 is performed. In S2312, the CPU 101 calculates an adaptive control amount of an adaptive controller and proceeds to S2310. This process corresponds to the conversion in block 2104 of FIG. 21 and the calculation processes of the adder 2105 and the multiplier 2106. Before the adaptive identification process is executed, the adaptive control amount is calculated using the initial values of the estimation parameter values 1 and 2. In S2312, the CPU 101 adds the adaptive control amount and the feedback control amount, outputs the addition result to the control signal output unit 104 and the adder 1102, and ends the process. This process corresponds to the calculation process of the adder 2108 of FIG. 21.

Next, the adaptive identification process illustrated in S2310 of FIG. 23 will be described with reference to the flowchart of FIG. 24. In S2401, the CPU 101 acquires the present actual position processed by the position encoding processor 602. In S2402, the CPU 101 adds 1 to the adaptive identification process count. After that, the process proceeds to S2403. In S2403, the same process as S1903 of FIG. 19 is performed.

In S2404, the CPU 101 stores the initial values of the state filter output values 1 and 2 stored in the ROM 102 in the RAM 103 as the initial values of blocks 1701 and 1707 and proceeds to S2410. In S2405, the CPU 101 acquires the previously stored position (previous position) stored in the RAM 103. The previous position is the position indicated by the data stored in the RAM 103 in S2410 to be described later. The CPU 101 estimates a velocity from the difference (that is, a moving amount) between the present position and the previous position. This process corresponds to the conversion in block 1706 of FIG. 22.

In S2406, the CPU 101 adds the product of the estimation parameter value 1 and the state filter output value 1 and the product of the estimation parameter value 2 and the state filter output value 2 to calculate the identifier output similarly to S1906. Further, the CPU 101 calculates the difference between the actual velocity calculated in S2405 and the identifier output as an identification error and proceeds to S2407. In S2407, the same process as S1907 of FIG. 19 is performed.

In S2408, the CPU 101 performs filtering on the control amount obtained by subtracting the attitudinal change correction amount stored in S2307 from the output of S2313, which is the addition result between the feedback control amount calculated in S2305 and the adaptive control amount calculated in S2312 to update and store the state filter output value 1. After that, the process proceeds to S2409. This process corresponds to the subtraction process of the adder 1102 of FIG. 22 and the conversion in block 1701. Since the attitudinal change correction amount is subtracted from the control amount output to the control signal output unit 104, a control amount which is normalized to a horizontal attitude is obtained.

In S2409, the CPU 101 performs filtering on the actual velocity calculated in S2405 to update and store the state filter output value 2 and then proceeds to S2410. In S2410, the CPU 101 stores the present actual position acquired from the position encoding processor 602 in the RAM 103 as the position for the next adaptive identification process, and then the process ends.

Although an attitudinal change of a object to be controlled during adaptive identification becomes the cause of an identification error, the identification error can be suppressed in the present embodiment. As described above, this results from the effect of the process of subtracting low-frequency components of the attitudinal change correction amount in the stopping period from the control amount input to the adaptive identification process. That is, in the present embodiment, the identification error is smaller than that when the attitudinal change is not taken into consideration because the process is equivalent to identifying from a control amount that is always normalized to a horizontal attitude.

Moreover, in the present embodiment, the feedback control amount output to resist an attitudinal change of the object to be controlled during position control of controlling the object to be controlled to be positioned at a fixed position is stored in the storage unit, and the control amount stored in the storage unit is subtracted from the control amount output to the control signal output unit and used for identification. Thus, since a control amount that does not contribute to a velocity change for resisting the attitudinal change of the object to be controlled is removed, it is possible to suppress an identification error resulting from the attitudinal change. Therefore, it is possible to stabilize position servo control when the adaptive identification result is used as an adaptive control amount calculation parameter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-186020 filed on Sep. 12, 2014 and Japanese Patent Application No. 2015-167573 filed on Aug. 27, 2015 which are hereby incorporated by reference wherein in their entirety.

What is claimed is:

1. A position control device comprising:
an encoder that detects a position of an object to be controlled;
a processor constructed to:
output a target velocity and a target position of the object to be controlled,
calculate a first control amount for causing the object to be controlled to track the target position,
calculate a second control amount for controlling the velocity of the object to be controlled to be at the target velocity,
calculate a total control amount obtained by adding the first control amount and the second control amount, and
acquire a correction amount on the basis of the first control amount or the total control amount when the object to be controlled is kept at a first position, wherein the processor is further constructed to output a corrected control amount as the second control amount, the corrected control amount being calculated on the basis of the acquired correction amount and a third control amount calculated from the target velocity while a velocity of the object to be controlled is changed into the target velocity.

2. The position control device according to claim 1, the processor is further constructed to:
   (i) estimate a disturbance from a control amount obtained by subtracting the acquired correction amount stored in a storage unit from the total control amount and a moving amount of the object to be controlled, and (ii) calculate a disturbance canceling control amount that cancels the disturbance from the control amount, during position control of causing the object to be controlled to track the target position,
   wherein the processor is further constructed to output a control signal to the object to be controlled according to the total control amount obtained by adding the first control amount and the second control amount or the total control amount and the disturbance canceling control amount.

3. The position control device according to claim 2, wherein the processor is further constructed to output the control signal to the object to be controlled according to the total control amount obtained by adding the first control amount and the second control amount without adding the disturbance canceling control amount during the position control of controlling the object to be controlled to be at a fixed position.

4. The position control device according to claim 1, wherein the processor is further constructed to calculate an attitudinal-change-corrected control amount by adding a feedforward control amount and an attitudinal change correction amount.

5. The position control device according to claim 4, wherein the processor is further constructed to:
   acquire acceleration information calculated from the target velocity of the object to be controlled and convert the acceleration information to the second control amount,
   generate a first value that indicates whether or not the acceleration information converges,
   multiply the first value and the attitudinal change correction amount to generate a second value, and
   add the second value and the second control amount to generate a third value.

6. The position control device according to claim 5, wherein the first value is zero when it is determined that the acceleration information converges and a number other than zero when it is determined that the acceleration information does not converge.

7. The position control device according to claim 5, wherein the processor is further constructed to:
   generate a fourth value indicating whether a control state of the object to be controlled is in an accelerating state or a braking state.

8. The position control device according to claim 7, wherein the fourth value is zero when it is determined that the control state of the object to be controlled is in the braking state and a number other than zero when it is determined that the control state of the object to be controlled is not in the braking state.

9. The position control device according to claim 1, further comprising:
   a memory constructed to store a passing amount,
   wherein the processor is further constructed to obtained the passing amount by passing the first control amount or the total control amount through a low-pass filter process as an attitudinal change correction amount.

10. The position control device according to claim 1, wherein the object to be controlled is driven by an actuator that does not exert a holding force when thrust is not generated.

11. The position control device according to claim 1, wherein the processor is further constructed to:
   determine whether the first control amount or the total control amount keeps the object to be controlled to the first position or moves the object to be controlled to the target position, and
   acquire the correction amount when the first control amount keeps the object to be controlled to the first position.

12. The position control device according to claim 1, further comprising:
   an actuator configured to drive on the basis of the total control amount.

13. An optical device comprising:
   the position control device according to claim 1.

14. An image pickup apparatus comprising:
   the position control device according to claim 1.

15. A position control method comprising:
   detecting a position of an object to be controlled;
   outputting a target velocity and a target position of the object to be controlled;
   calculating a first control amount for causing the object to be controlled to track the target position;
   calculating a second control amount for controlling a velocity of the object to be controlled to be at the target velocity;
   calculating a total control amount obtained by adding the first control amount and the second control amount; and
   acquiring a correction amount on the basis of the first control amount or the total control amount when the object to be controlled is kept at a first position,
   wherein the second control amount is a corrected control amount that is calculated on the basis of the correction amount and a control amount calculated from the target velocity while the velocity of the object to be controlled is changed into the target velocity.

16. An image pickup apparatus comprising:
   the position control device according to claim 12; and
   an optical member configured to be driven by the actuator.

* * * * *